US011037129B1

(12) United States Patent
Chen et al.

(10) Patent No.: US 11,037,129 B1
(45) Date of Patent: Jun. 15, 2021

(54) CONSUMER DEVICE PRESENCE-BASED TRANSACTION SESSION

(71) Applicant: Groupon, Inc., Chicago, IL (US)

(72) Inventors: Michael Chen, San Francisco, CA (US); Robert James Skillington, San Francisco, CA (US); Jay Walter Robinson, Palo Alto, CA (US); Tuomas Santeri Artman, San Francisco, CA (US); Cristian Matias Sepulveda, San Francisco, CA (US); Joshua Isaac Zloof, San Francisco, CA (US); Leslie Jean Chicoine, San Francisco, CA (US); Mahmudul Arefin Din, San Francisco, CA (US)

(73) Assignee: Groupon, Inc., Chicago, IL (US)

( * ) Notice: Subject to any disclaimer, the term of this patent is extended or adjusted under 35 U.S.C. 154(b) by 982 days.

(21) Appl. No.: 14/311,098

(22) Filed: Jun. 20, 2014

Related U.S. Application Data

(60) Provisional application No. 61/943,961, filed on Feb. 24, 2014.

(51) Int. Cl.
*G06Q 20/32* (2012.01)
*G06Q 20/20* (2012.01)
*G06Q 20/36* (2012.01)
*G06Q 20/40* (2012.01)

(52) U.S. Cl.
CPC ......... *G06Q 20/327* (2013.01); *G06Q 20/202* (2013.01); *G06Q 20/36* (2013.01); *G06Q 20/40* (2013.01)

(58) Field of Classification Search
CPC ...... G06Q 20/327; G06Q 20/40; G06Q 20/36; G06Q 20/202
See application file for complete search history.

(56) References Cited

U.S. PATENT DOCUMENTS

| 7,324,957 | B2 |  | 1/2008 | Boys |  |
|---|---|---|---|---|---|
| 8,229,458 | B2 |  | 7/2012 | Busch |  |
| 8,498,900 | B1 | * | 7/2013 | Spirin | G06Q 20/14 705/15 |
| 9,195,984 | B1 | * | 11/2015 | Spector | G06Q 20/322 |

(Continued)

*Primary Examiner* — Florian M Zeender
*Assistant Examiner* — Whitney Poffenbarger
(74) *Attorney, Agent, or Firm* — Alston & Bird LLP

(57) ABSTRACT

Systems, apparatus, and methods for providing a consumer device presence-based transaction sessions are discussed herein. Some embodiments may provide for an apparatus configured to establish consumer device presence-based transaction sessions. The apparatus and consumer device may wirelessly communicate for a variety interactions within the transaction session. For example, consumers may be allowed to provide one or more instances of consumer approval data for payment. The transaction session may be closed upon receipt of consumer approval data or may be kept open based on wirelessly polling for consumer device presence. Based on the lack of consumer device presence, the apparatus may be configured to close the transaction session and subsequently facilitate a transaction. In various embodiments, the apparatus may be a merchant device or a server. For example, the apparatus may be a server of a central system configured to facilitate transaction sessions between merchant devices and consumer devices.

16 Claims, 11 Drawing Sheets

(56) References Cited

U.S. PATENT DOCUMENTS

| | | |
|---|---|---|
| 2003/0132298 A1 | 7/2003 | Swartz et al. |
| 2007/0244750 A1 | 10/2007 | Grannan et al. |
| 2008/0207296 A1* | 8/2008 | Lutnick ............... G07F 17/3272 463/16 |
| 2011/0035270 A1 | 2/2011 | Matsunaga et al. |
| 2011/0154049 A1 | 6/2011 | Hertel et al. |
| 2012/0158513 A1 | 6/2012 | Schoen et al. |
| 2012/0323685 A1 | 12/2012 | Ullah |
| 2013/0041752 A1 | 2/2013 | Crum |
| 2014/0087655 A1* | 3/2014 | Hall ..................... H04B 5/0056 455/41.1 |
| 2014/0179354 A1* | 6/2014 | Fisher .................... H04W 4/02 455/456.3 |
| 2014/0244409 A1* | 8/2014 | Nathanel ............... G06Q 30/02 705/15 |
| 2014/0279014 A1 | 9/2014 | Roka et al. |
| 2015/0019391 A1* | 1/2015 | Kumar ................ G06Q 10/087 705/28 |

\* cited by examiner

US 11,037,129 B1

CONSUMER DEVICE PRESENCE-BASED TRANSACTION SESSION

CROSS REFERENCE TO RELATED APPLICATIONS

This application claims the benefit of U.S. Provisional Patent Application No. 61/943,961, titled "Consumer Device Presence-Based Transaction Session," filed Feb. 24, 2014, which is incorporated by reference herein in its entirety.

FIELD

Embodiments of the invention relate, generally, to point-of-sale using mobile devices.

BACKGROUND

Point-of-sale devices allow consumers to make payments to merchants, such as by providing a credit card, cash, or other form of payment to a merchant at a cash register or table (e.g., for a dine-in restaurant). More recent systems have provided for consumer payments via mobile device in lieu of the more traditional payment techniques. While such systems can provide enhanced convenience and security at the payment stage, the quality of the consumer experience at a merchant shop often depends on other additional aspects of the merchant-consumer interaction. In this regard, areas for improving current systems have been identified. Through applied effort, ingenuity, and innovation, solutions to improve such systems have been realized and are described herein.

BRIEF SUMMARY

Systems, methods, and computer readable program code are provided to, in general, improve merchant and consumer interactions. Some embodiments may provide for an apparatus including circuitry configured to determine consumer identifying data associated with a consumer device and wirelessly receive a request from the consumer device to initiate a transaction session between a merchant device associated with a merchant and the consumer device. In some embodiments, the apparatus may be the merchant device. In another example, the apparatus may be one or more servers (e.g., of a central system) configured to facilitate a consumer device initiated transaction session between the merchant device and the consumer device. In response to receiving the request, the circuitry may be further configured to establish the transaction session between the merchant device and the consumer device and associate the consumer identifying data with the transaction session. Subsequent to initiating the transaction session, the circuitry may be further configured to: receive one or more instances of consumer approval data for a transaction, wirelessly poll the consumer device to determine a merchant proximity score between the consumer device and the merchant device, and close the transaction session and facilitate the transaction based on either receiving the one or more instances of consumer approval data or determining that the merchant proximity score fails to exceed a merchant proximity score threshold.

In some embodiments, the circuitry may be part of the merchant device and configured to determine the consumer identifying data includes the circuitry being configured to: wirelessly receive wallet identifying data from the consumer device; transmit the wallet identifying data to a central system; and subsequent to transmitting the wallet identifying data to the central system, receive, from the central system, the consumer identifying data associated with the wallet identifying data.

In some embodiments, the circuitry configured to determine the consumer identifying data includes the circuitry being configured to wirelessly receive the consumer identifying data from the consumer device.

In some embodiments, the circuitry may be configured to forego initiating the transaction session when the consumer identifying data is determined until receiving the request from the consumer device to initiate the transaction session.

In some embodiments, the circuitry may be configured to: determine second consumer identifying data associated with a second consumer device; wirelessly receive a second request from the second consumer device to be added to the transaction session; and in response to receiving the second request: associate the second consumer device with the transaction session including the merchant device and the consumer device; and associate the second consumer identifying data with the transaction session.

In some embodiments, the apparatus may be the merchant device. The merchant proximity score may be determined based on the circuitry being configured to determine whether the consumer device is within a communicable range of a direct wireless connection with the merchant device.

In some embodiments, the circuitry may be further configured to, response to determining that the merchant proximity score exceeds the merchant proximity score threshold: wirelessly poll the consumer device after at a second time to determine a second merchant proximity score; and determine whether the second merchant proximity score exceeds the merchant proximity score threshold, the second time being a predetermined duration after the first time.

In some embodiments, the circuitry may be further configured to, in response to determining that the merchant proximity score fails to exceed the merchant proximity score threshold at a first time: determine a transaction session closure time subsequent to the first time; wirelessly poll the consumer device at the transaction session closure time to determine a second merchant proximity score; and in response to determining that the second merchant proximity score fails to exceed a merchant proximity score threshold, close the transaction session.

In some embodiments, the circuitry may be further configured to, subsequent to initiating the transaction session and prior to closing the transaction session: associate one or more items with the transaction session; and wirelessly provide an indication of the one or more items to the consumer device.

In some embodiments, the circuitry may be further configured to, subsequent to initiating the transaction session: wirelessly receive order data from the consumer device; and associate the one or more items with the transaction session.

In some embodiments, the circuitry may be further configured to wirelessly receive the request from the consumer device to initiate the transaction session when the consumer device is within a communicable range of a direct wireless connection with the merchant device.

In some embodiments, the circuitry may be further configured to associate the transaction session with a unit of location based on the consumer device being within a communicable range of a PAN comprising a direct wireless connection with at least one of the merchant device and a communication beacon.

Some embodiments may provide for a machine-implemented method including: determining, by circuitry, consumer identifying data associated with a consumer device; wirelessly receiving, by the circuitry, a request from the consumer device to initiate a transaction session between a merchant device associated with a merchant and the consumer device; in response to receiving the request: establishing, by the circuitry, the transaction session between the merchant device and the consumer device; associating, by the circuitry, the consumer identifying data with the tab session; and subsequent to initiating the transaction session, and by the circuitry: receiving one or more instances of consumer approval data for a financial transaction; wirelessly polling the consumer device to determine a merchant proximity score between the consumer device and the merchant device; and closing the transaction session and facilitating the transaction based on either receiving the one or more instances of consumer approval data or determining that the merchant proximity score fails to exceed a merchant proximity score threshold.

In some embodiments, determining the consumer identifying data may include: wirelessly receiving wallet identifying data from the consumer device; transmitting the wallet identifying data to a central system; and receiving, from the central system, the consumer identifying data associated with the wallet identifying data.

In some embodiments, the method may further include forego initiating, by the circuitry, the transaction session when the consumer identifying data is determined until receiving the request from the consumer device to initiate the transaction session.

In some embodiments, the method may further include, by the circuitry: determining second consumer identifying data associated with a second consumer device; wirelessly receiving a second request from the second consumer device to be added to the transaction session; and in response to receiving the second request: associating the second consumer device with the transaction session including the merchant device and the consumer device; and associating the second consumer identifying data with the transaction session.

In some embodiments, wherein the merchant device may include the circuitry and the merchant proximity score may be determined based on determining whether the consumer device is within a communicable range of a direct wireless connection with the merchant device.

In some embodiments, the method may further include, by the circuitry and in response to determining that the merchant proximity score fails to exceed the merchant proximity score threshold at a first time: determining a transaction session closure time subsequent to the first time; wirelessly polling the consumer device at the transaction session closure time to determine a second merchant proximity score; and in response to determining that that the second merchant proximity score fails to exceed a merchant proximity score threshold, closing the transaction session.

In some embodiments, the method may further include, by the circuitry subsequent to initiating the transaction session and prior to closing the transaction session: associating one or more items with the transaction session; and wirelessly providing an indication of the one or more items to the consumer device.

In some embodiments, the method may further include, by the circuitry and subsequent to initiating the transaction session: wirelessly receiving order data from the consumer device indicating one or more items to; and associating the one or more items with the transaction session.

In some embodiments, the method may further include wirelessly receiving the request from the consumer device to initiate the transaction session when the consumer device is within is within a communicable range of a direct wireless connection with the merchant device.

Some embodiments may include a system. The system may include an apparatus and a consumer device. The apparatus may include circuitry configured to: circuitry configured to: determine consumer identifying data associated with a consumer device; wirelessly receive a request from the consumer device to initiate a transaction session between a merchant device associated with a merchant and the consumer device; in response to receiving the request: establish the transaction session between the merchant device and the consumer device; and associate the consumer identifying data with the tab session. The consumer device may include a user input device and circuitry. The circuitry may be configured to: wirelessly provide the request to the apparatus to initiate the transaction session, wherein the request is generated via the user input device; subsequent to establishing the transaction session and prior to closure of the transaction session, provide one or more instances of consumer approval data for a financial transaction to the apparatus.

In some embodiments, the circuitry of the apparatus may be further configured to: wirelessly poll the consumer device at a first time to determine a merchant proximity score between the consumer device and a merchant device; and in response to determining that the merchant proximity score fails to exceeds a merchant proximity score threshold at the first time: determine a transaction session closure time subsequent to the first time; wirelessly poll the consumer device at the transaction session closure time; and in response to determining that the second merchant proximity score fails to exceed the merchant proximity score threshold: close the transaction session; and facilitate the financial transaction based on a most recent instance of consumer approval data of the one or more instances of consumer approval data.

In some embodiments, apparatus may be the merchant device and the circuitry of the apparatus may be configured to determine the merchant proximity score based on the circuitry of the apparatus being configured to determine whether the consumer device is within a communicable range of a direct wireless connection with the merchant device.

Other embodiments may include one or more machines, such as an apparatus and/or system, configured to implement the methods and/or other functionality discussed herein. For example, the machine or apparatus may include one or more processors and/or other machine components (e.g., circuitry) configured to implement the functionality discussed herein based on instructions and/or other data stored in memory and/or other non-transitory computer readable media.

These characteristics as well as additional features, functions, and details are described below. Similarly, corresponding and additional embodiments are also described below.

BRIEF DESCRIPTION OF THE DRAWINGS

Figure 1:
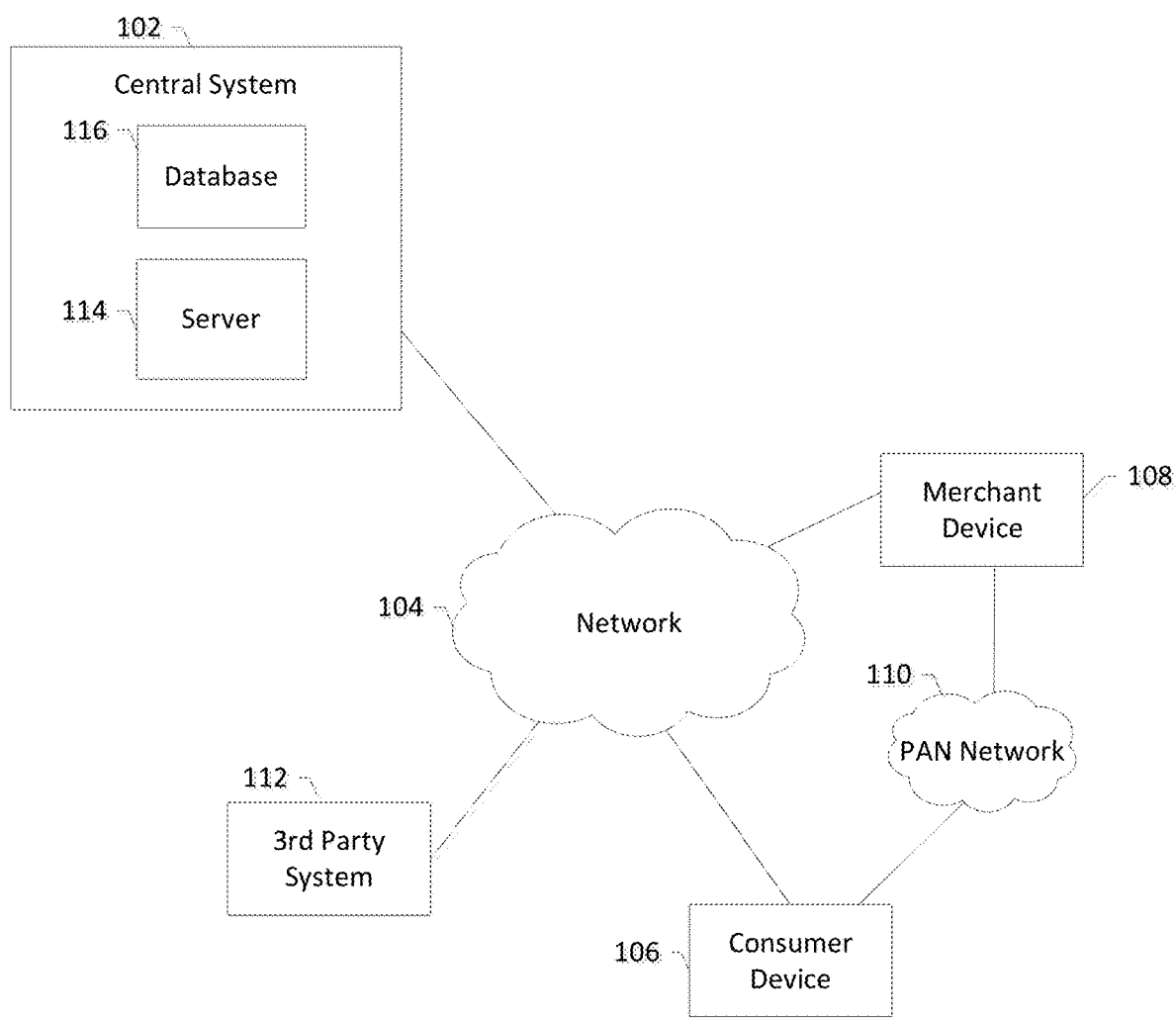
Figure 2:
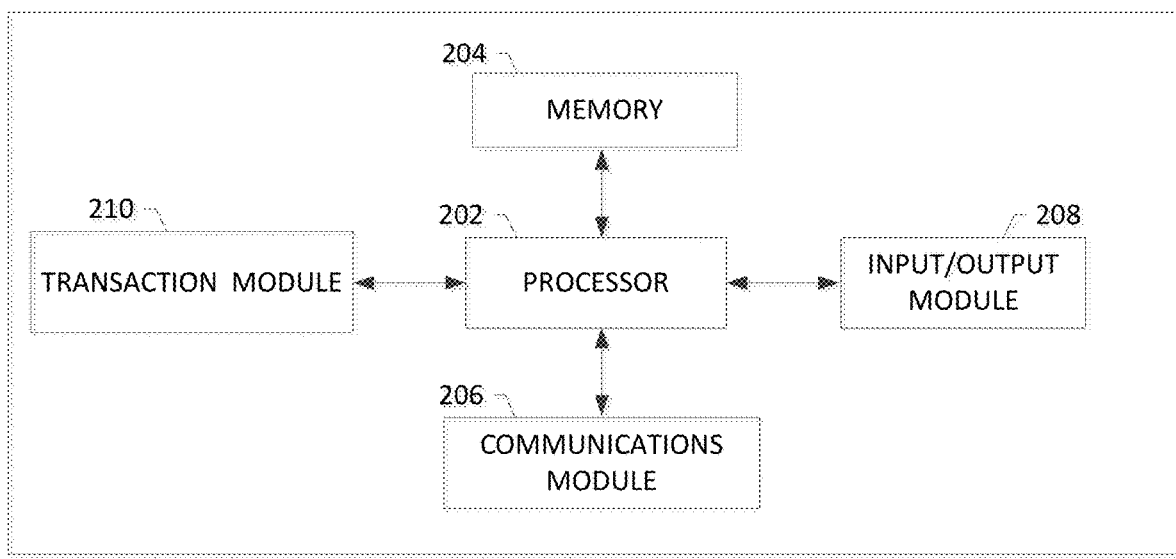

Having thus described some embodiments in general terms, reference will now be made to the accompanying drawings, which are not necessarily drawn to scale, and wherein:

FIG. 1 shows an example of a system in accordance with some embodiments;

FIG. 2 shows a schematic block diagram of an example of circuitry in accordance with some embodiments.

Figure 3:
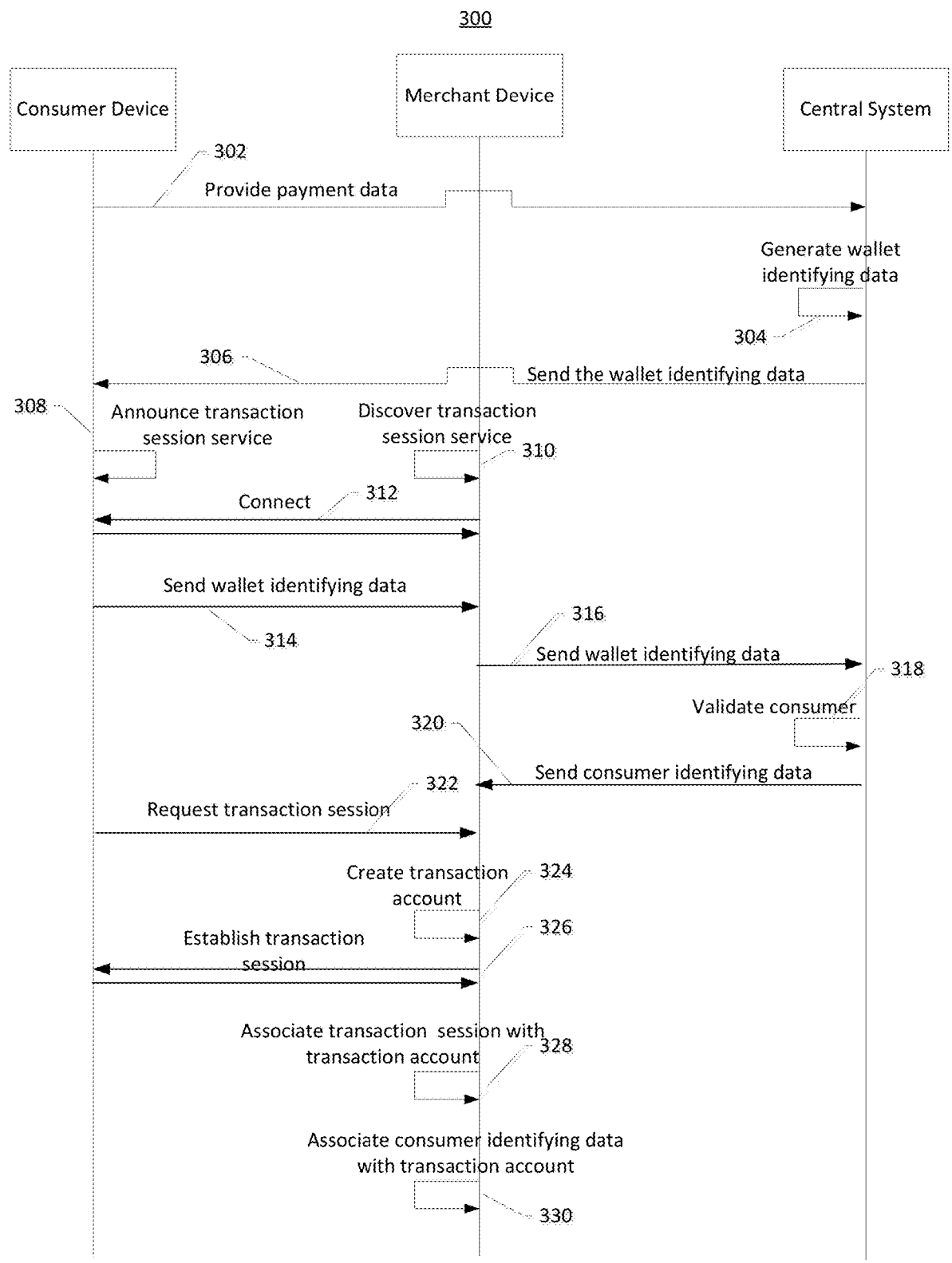
Figure 4:
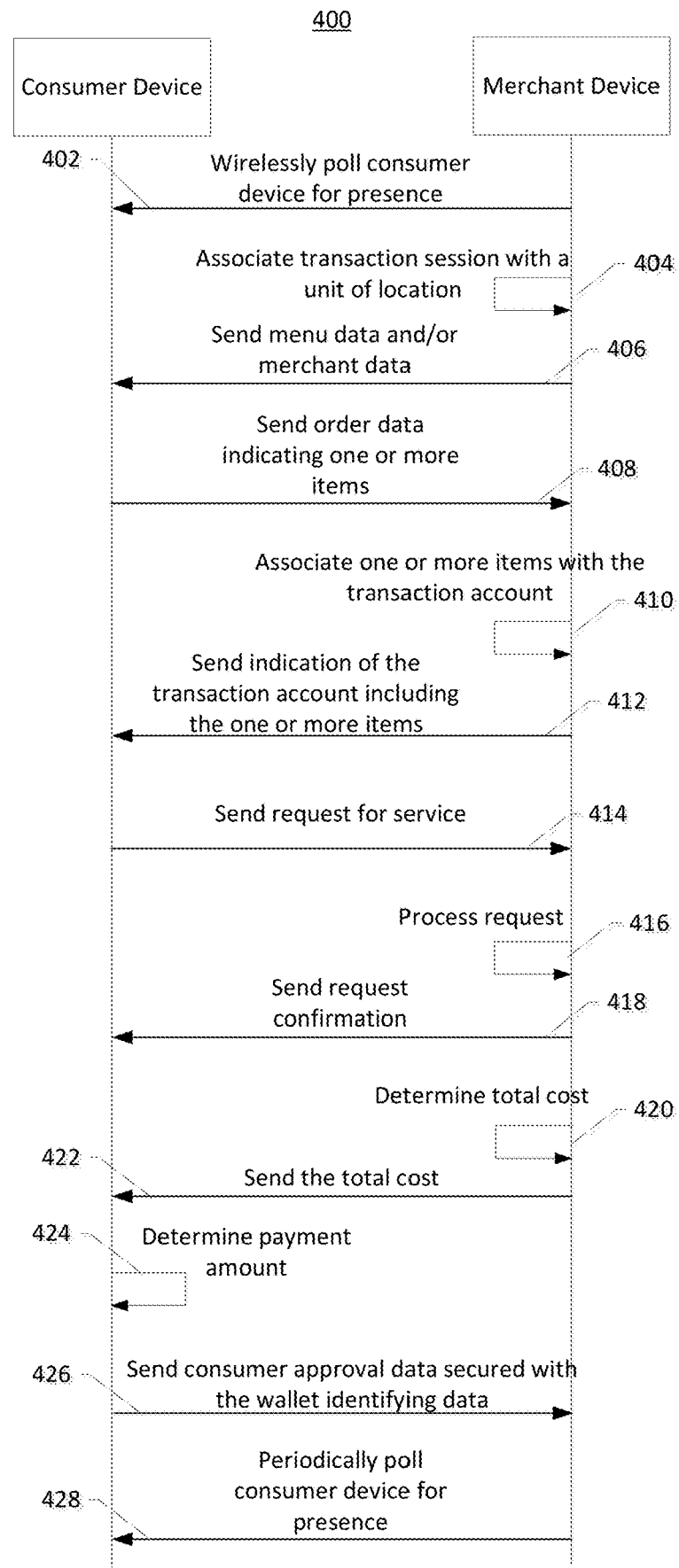
Figure 5:
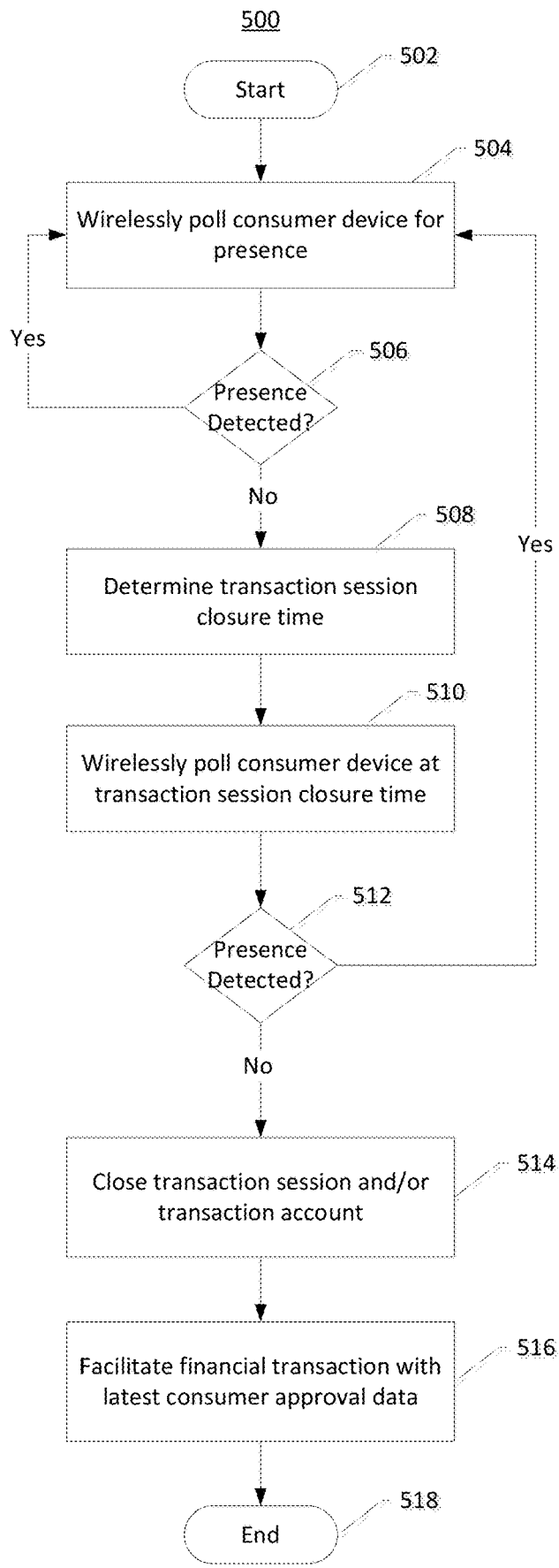
Figure 6:
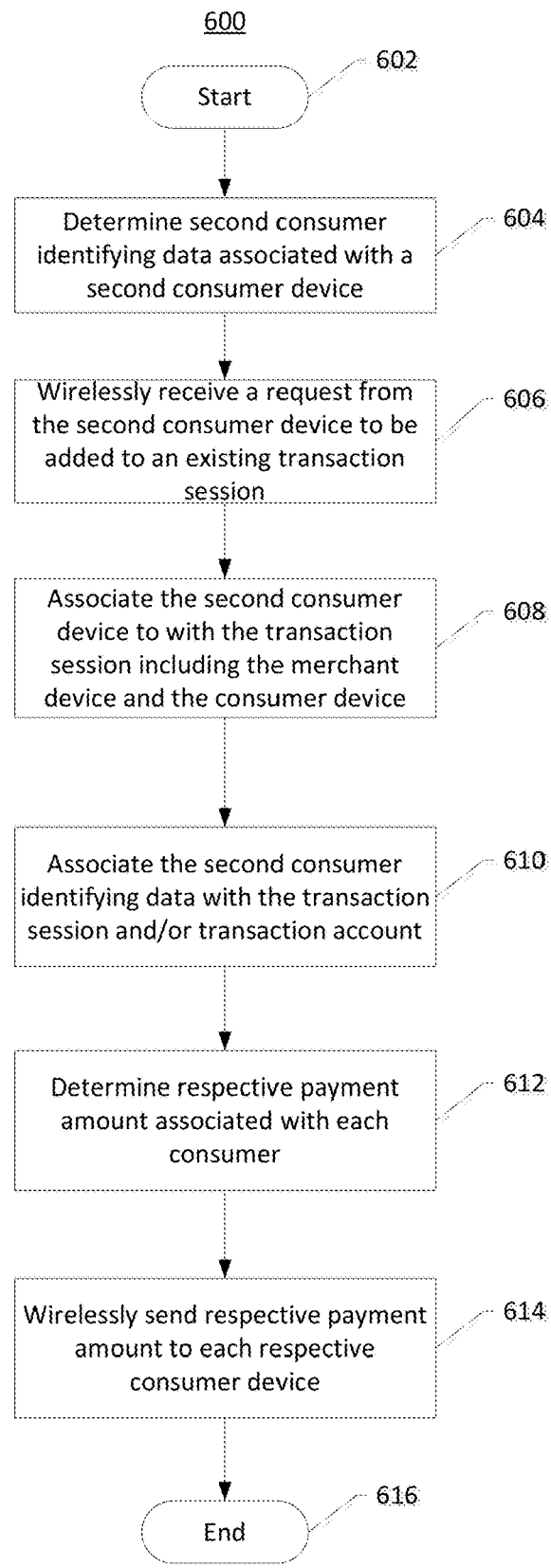
Figure 15:
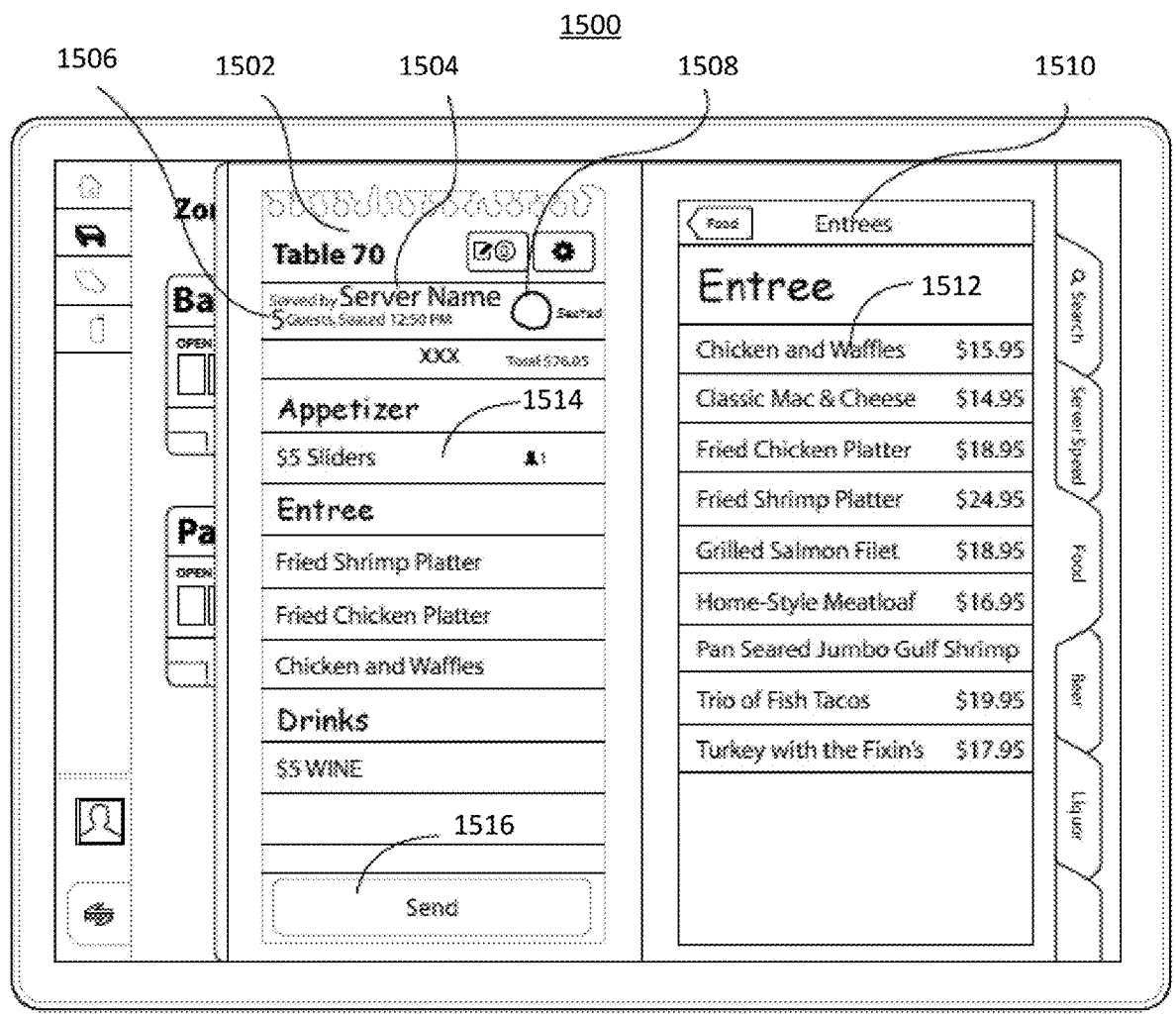
Figure 16:
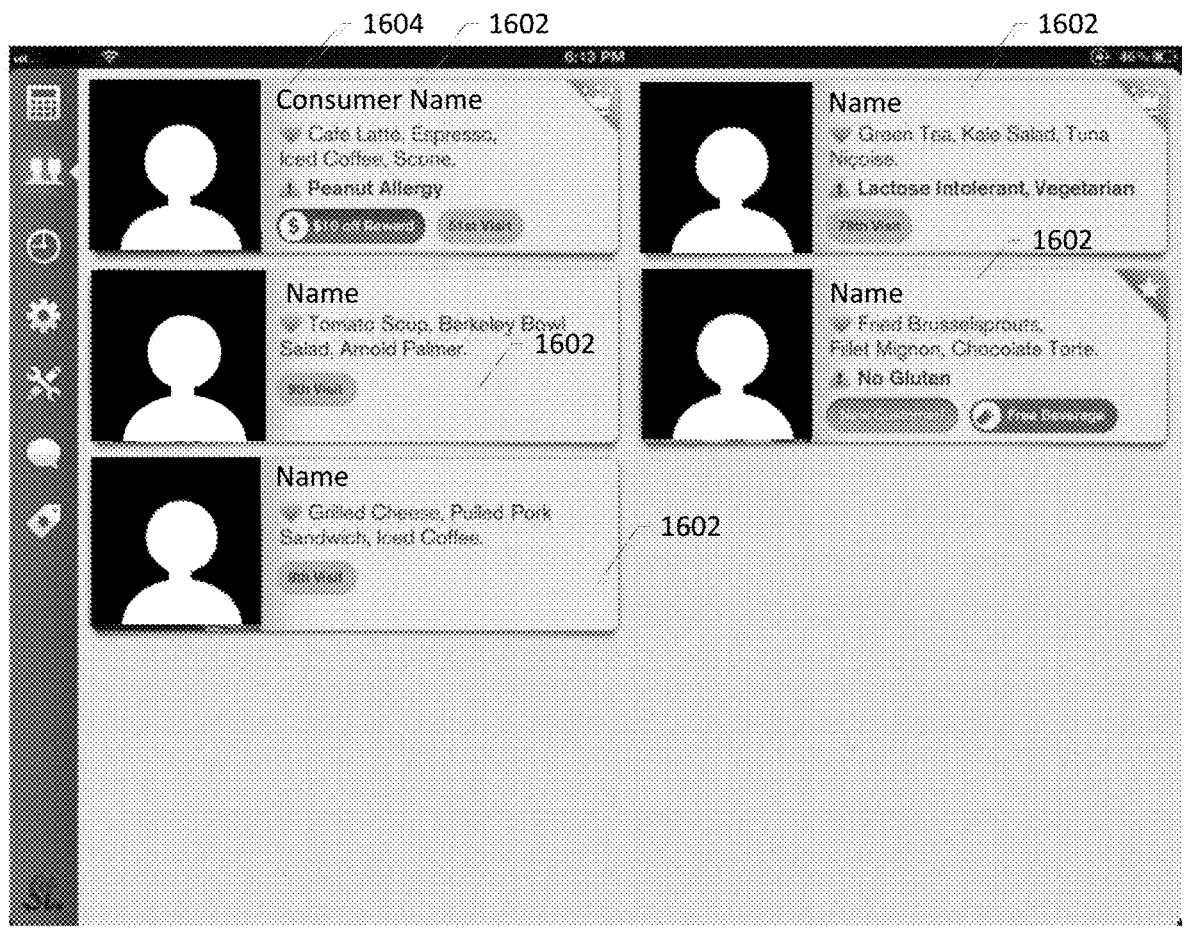
Figure 17:
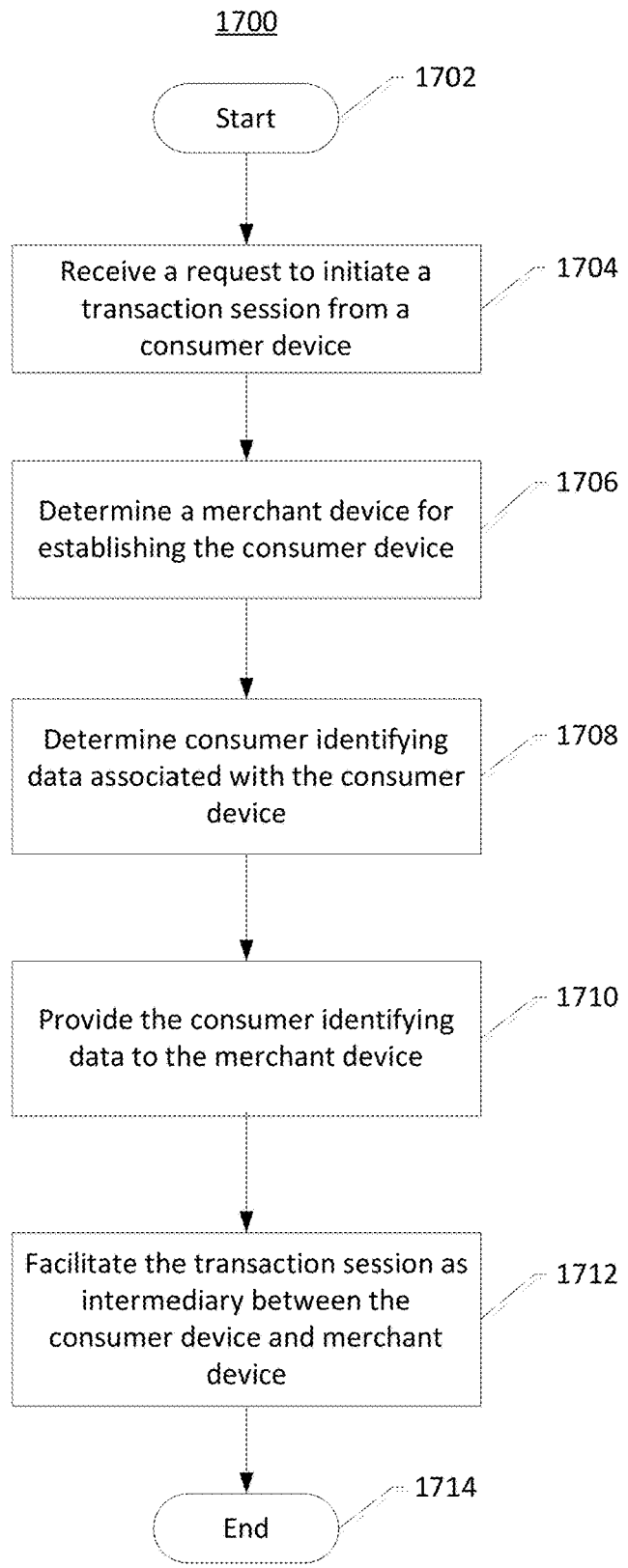

FIG. 3 shows a flowchart of an example method of establishing a transaction session in accordance with some embodiments;

FIG. 4 shows a flowchart of an example of a method of facilitating consumer and merchant interactions within a transaction session in accordance with some embodiments;

FIG. 5 shows a flowchart of an example of a method of closing a transaction session in accordance with some embodiments;

FIG. 6 shows a flowchart of an example of a method of facilitating consumer and merchant interactions within a transaction session for a plurality of consumers in accordance with some embodiments;

FIGS. 7-14 show examples of graphical consumer interface displays that may be presented on a consumer device in connection with a transaction session in accordance with some embodiments;

FIGS. 15 and 16 show examples of graphical merchant interface displays that may be presented on a merchant device in connection with a transaction session in accordance with some embodiments; and FIG. 17 shows a flowchart of an example of a method of facilitating a transaction session with a central system in accordance with some embodiments.

DETAILED DESCRIPTION

Embodiments now will be described more fully hereinafter with reference to the accompanying drawings, in which some, but not all embodiments are shown. Indeed, embodiments of the invention may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Overview

An advantage that may be realized by some embodiments discussed herein is that when a consumer device enters the vicinity of or is otherwise within communicable range (sometimes referred to herein as being "in proximity") with a compatible merchant device, the consumer to which the consumer device belongs may be allowed to initiate a transaction session with the merchant device that can enhance some or all of the consumer and merchant interaction. A "transaction session," as used herein, may refer to a consumer device presence-based connection between the consumer device and merchant device that ends subsequent to the consumer device being outside of wireless direct connection range (or communicable range) of the merchant device. For example, a consumer may walk into a dine-in restaurant with a consumer device (e.g., a mobile phone) resulting in the presence and/or identity of the consumer being detected by a merchant device (e.g., a point-of-sale device, tablet, dedicated communication beacon, etc.). Via an exchange of information, a connection can be established between the consumer device and the merchant device. Similarly, a merchant device may simultaneously communicate with various other consumer devices held by other consumers to serve such consumers as individuals and/or within a group.

When the consumer is ready to be served or otherwise engage a merchant, for example, the consumer may initiate a transaction session on the consumer device, such as by providing a user input on a user input device of the consumer device. The merchant device may receive the request and in response, create a transaction account. A "transaction account," as used herein, refers to a temporary account that is used to facilitate a financial transaction, such as a tab or electronic "shopping cart." In some examples, when the consumer is ready to order, the consumer may then simply tell the merchant the consumer's name or other identifying information (e.g. "put it on John Doe") which lets the merchant select the applicable transaction account and/or consumer identifying data on the merchant device for taking one or more orders. The merchant device may be further configured to provide point-of-sale functionality that allows the merchant to update items within the transaction account, facilitate payment, close the transaction account, etc.

In some embodiments, the transaction session may be initiated between the consumer device and merchant device that allows for a flow of information between the consumer and merchant prior to the closure of the transaction session. For example, each item entered by the merchant may be sent to the consumer device (e.g., in real-time) so that the consumer can verify the order. Other types of communications within the transaction session may include allowing to consumer and/or merchant to select a seating location, join a consumer to an existing transaction account or transaction session (e.g., initiated by another consumer device), request merchant assistance via consumer device which is indicated on the merchant device, browse a menu, add, remove and/or modify the tab, preconfigure a payment, and/or among other things. For each interaction, in some embodiments, any modifications or updates to the transaction session and/or related information by a merchant device or consumer device can be shared (e.g., in real-time) between the merchant device and the consumer device.

In some embodiments, the transaction session may allow for the consumer to approve, preconfigure and/or reconfigure a payment. For example, when the consumer is satisfied with the items in the transaction account, the consumer may use the consumer device to send consumer approval data indicating consumer consent for a payment. In some embodiments, receiving the merchant device may close the transaction session in response to receiving the consumer approval data. In some embodiments, prior to the closure of the transaction session, the merchant device may store and/or otherwise forego further processing of the consumer approval data while the transaction session is active. In that sense, the consumer may be allowed to make modifications to the transaction account including any addition, subtraction, and/or modification of items while the consumer device remains within the wireless direct connection range (or communicable range) of the merchant device. For example, when the merchant device receives second consumer approval data in a transaction session subsequent to first consumer approval data within the same transaction session, the merchant device may replace the first consumer approval data with the second consumer approval data and/or otherwise forego using the first consumer approval data. In that sense, transaction fees and/or other operating costs associated with multiple payments, reimbursements, refunds, etc., can be reduced.

In some embodiments, a wireless direct and/or local connection (e.g., via a personal area network ("PAN")) may be created between the merchant device (which may include a device configured to perform point-of-sale functionality and/or a dedicated communication beacon) and one or more nearby consumer devices. The local connection allows a consumer device to communicate with the merchant device based on presence, such as without requiring an active connection to the Internet or a central system. Advantageously, the consumer device is capable of wireless communication, even in locations or shops where a mobile broadband or other wireless internet connection is unavailable.

Some embodiments may provide for secure merchant device and consumer device interactions. For example, to ensure that sensitive information (e.g., financial data, transaction data, consumer identifying data, etc.) is not passed via the direct wireless connection, the consumer device and the merchant device may be configured to share wallet identifying data and/or other data secured with wallet identifying data. The wallet identifying data may have no meaning and/or may be otherwise useless to unauthorized devices, but may be used by the central system to facilitate secure communications between the merchant device and the consumer device for purposes such as consumer identification and/or payments. For example, the wallet identifying data may include one or more keys, random numbers, codes, and/or other types of tokens that are generated by a central system.

In some embodiments, a central system may be configured to facilitate transaction sessions between merchant devices and consumer devices. For example, the central system may receive a request from a consumer device to initiate a transaction session with a merchant. Based on the request, the central system may determine a suitable merchant device and provide consumer information to the merchant device. For example, the central system may determine the merchant device based on consumer selection of a merchant, the location of the consumer, consumer device presence detection by a merchant device and/or communication beacon, among other things. The central system may then serve as an intermediary for the exchange of data between the merchant and consumer within the transaction session. In that sense, a "transaction session," may refer to a connection between the consumer device and merchant device via a central system that is initiated by the consumer.

Some embodiments may provide for convenient forms of payment. For example, a consumer may be allowed to add a payment method (e.g., credit card), tip amount, or the like that can be "stored" for subsequent use. Data related to the preconfigured payment may be passed to the merchant device during the transaction session (e.g., at any time and may even be modified/resubmitted) and the consumer may simply leave the merchant shop at the consumer's preference (e.g., after providing one or more instances of consumer approval data). The merchant device may detect the lack of consumer presence (e.g., via periodic polling of the consumer device), indicating that the transaction session is to be closed, and then facilitate a financial transaction (e.g., based on the latest consumer approval data). In these and other aspects, some embodiments herein may provide for enhanced merchant and consumer interactions with improved convenience, service quality and speed, consumer-merchant interactivity, among other things.

Exemplary System Architecture

FIG. 1 shows an example system 100 in accordance with some embodiments. System 100 may include central system 102 (or "system 102"), network 104, consumer device 106, merchant device 108, personal area network (PAN) 110, and third party system 112. System 102 may be communicably connected with consumer device 106 and merchant device 108 via network 104. System 102 may include server 114 and database 116.

Server 114 may include circuitry, networked processors, or the like configured to perform some or all of the server-based processes described herein and may be any suitable network server and/or other type of processing device. In some embodiments, system 102 may function as a "cloud" with respect to the consumer device 106 and/or merchant device 108. In that sense, server 114 may include several servers performing interconnected and/or distributed functions. To avoid unnecessarily overcomplicating the disclosure, server 114 is shown and described herein as a single server.

Database 116 may be any suitable network storage device configured to store some or all of the information described herein. For example, database 116 may be configured to store consumer information, merchant information, promotion information, and/or among other things. As such, database 116 may include, for example, one or more database systems, backend data servers, network databases, cloud storage devices, etc. To avoid unnecessarily overcomplicating the disclosure, database 116 is shown and described herein as a single database.

Network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (such as, e.g., network routers, switches, hubs, etc.). For example, network 104 may include a cellular telephone, mobile broadband, long term evolution (LTE), GSM/EDGE, UMTS/HSPA, IEEE 802.11, IEEE 802.16, IEEE 802.20, WiFi, dial-up, and/or WiMax network. Furthermore, network 104 may include a public network, such as the Internet, a private network, such as an intranet, or combinations thereof, and may utilize a variety of networking protocols now available or later developed including, but not limited to TCP/IP based networking protocols.

Consumer device 106 may be associated with a consumer and/or consumer account, such as a consumer with a consumer account provided by system 102. Although a single consumer device 106 is shown, system 100 may include any number of consumer devices that may be associated with various other consumers and/or consumer accounts. Consumer device 106 may be a mobile device and/or a stationary device. For example, consumer device 106 may be a mobile device such as a cellular telephone (including smartphones and/or other types of mobile telephones), laptop, tablet, electronic reader, e-book device, media device, and/or the like. Additionally and/or alternatively, consumer device 106 may be a stationary device such as a desktop computer, work station, point-of-sale device, or the like.

Merchant device 108 may be associated with a merchant, and may be located at a merchant shop and/or other location. Although a single merchant device 108 is shown, system 100 may include any number of merchant devices that may be associated with various other merchants. In some embodiments, merchant device 108 may be configured to provide point-of-sale (POS) functionality for the merchant, such as at the merchant's shop. Furthermore, merchant device 108 may be a stationary and/or mobile device. In some embodiments, merchant device 108 may include and/or may be in communication with one or more dedicated communication beacons. The one or more communication beacons and/or merchant device may be strategically located within a merchant shop to provide a web of consumer device presence detection, communication, and/or location determination (e.g., via received signal strength indication, triangulation, signal time-of-flight determination, etc.). In some embodiments, system 102 may be configured to receive promotion data indicating a promotion for goods and/or services and/or one or more parameters of the promotion (e.g., target audience, timing, purchase value, promotional value, residual value, etc.). System 102 may then generate and/or provide one or more impressions for the promotion to consumer device 102, which may be redeemed with the merchant via merchant device 108, such as in connection with a financial transaction of a transaction session.

In some embodiments, consumer device 106 may connect with merchant device 108 via network 104 and/or PAN network 110. As such, consumer device 106 may be configured to establish a transaction session with merchant device 108 via PAN network 110 even if consumer device 106 and/or merchant device 108 do not have active connections with network 104 and/or central system 102. PAN network 110 may be a wireless communication network utilizing protocols such as Bluetooth, Infrared Data Association (irDA), wireless USB, ZigBee, WiFi, and Z-Wave. However, any other type of connection between the consumer device and merchant device, such as direct wire, Internet, ultra-wideband, near field communications and/or radio frequency identification technologies, may alternatively or additionally be used.

In some embodiments, system 100 may further include one or more third party systems 112, among other things. For example, third party system 112 may be a payment server configured to provide for the exchange of money, credits, etc. between the merchant and consumer. In some embodiments, various third party systems 112 may be associated with different types of payment sources. Thus for each payment source, data may be sent to an appropriate third party system (e.g., a credit card transaction server, etc.) to validate and/or process payments.

FIG. 2 shows a schematic block diagram of example circuitry 200, some or all of which may be included in system 102, server 114, database 116, consumer device 106, and/or merchant device 108. In accordance with some example embodiments, circuitry 200 may include various means, such as one or more processors 202, memories 204, communications modules 206, and/or input/output modules 208.

In some embodiments, such as when circuitry 200 is included in server 114, consumer device 106 and/or merchant device 108, transaction module 210 may also or instead be included. As referred to herein, "module" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 204) that is executable by a suitably configured processing device (e.g., processor 202), or some combination thereof.

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, processor 202 may comprise a plurality of processing means. The plurality of processing means may be embodied on a single computing device or may be distributed across a plurality of computing devices collectively configured to function as circuitry 200. The plurality of processing means may be in operative communication with each other and may be collectively configured to perform one or more functionalities of circuitry 200 as described herein. In an example embodiment, processor 202 may be configured to execute instructions stored in memory 204 or otherwise accessible to processor 202. These instructions, when executed by processor 202, may cause circuitry 200 to perform one or more of the functionalities described herein.

Whether configured by hardware, firmware/software methods, or by a combination thereof, processor 202 may comprise an entity capable of performing operations according to embodiments discussed herein while configured accordingly. Thus, for example, when processor 202 is embodied as an ASIC, FPGA or the like, processor 202 may comprise specifically configured hardware for conducting one or more operations described herein. As another example, when processor 202 may be embodied as an executor of instructions, such as may be stored in memory 204, the instructions may specifically configure processor 202 to perform one or more algorithms, methods or operations described herein. For example, processor 202 may be configured to execute operating system applications, firmware applications, media playback applications, media editing applications, among other things.

Memory 204 may comprise, for example, volatile memory, non-volatile memory, or some combination thereof. Although illustrated in FIG. 2 as a single memory, memory 204 may comprise a plurality of memory components. The plurality of memory components may be embodied on a single computing component or distributed across a plurality of computing components. In various embodiments, memory 204 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 204 may be configured to store information, data, applications, instructions, or the like for enabling circuitry 200 to carry out various functions in accordance with example embodiments discussed herein. For example, in at least some embodiments, memory 204 may be configured to buffer input data for processing by processor 202. Additionally or alternatively, in at least some embodiments, memory 204 may be configured to store program instructions for execution by processor 202 and/or data for processing by processor 202. Memory 204 may store information in the form of static and/or dynamic information. This stored information may be stored and/or used by circuitry 200 during the course of performing its functionalities.

Communications module 206 may be embodied as any component or means embodied in circuitry, hardware, a computer program product comprising computer readable program instructions stored on a computer readable medium (e.g., memory 204) and executed by a processing device (e.g., processor 202), or a combination thereof that is configured to receive and/or transmit data from/to another device, such as, for example, a second circuitry 200 and/or the like. In some embodiments, communications module 206 (like other components discussed herein) can be at least partially embodied as or otherwise controlled by processor 202. In this regard, communications module 206 may be in communication with processor 202, such as via a bus. Communications module 206 may include, for example, an antenna, a transmitter, a receiver, a transceiver, network interface card and/or supporting hardware and/or firmware/software for enabling communications. Communications module 206 may be configured to receive and/or transmit any data that may be stored by memory 204 using any protocol that may be used for communications. Communications module 206 may additionally and/or alternatively be in communication with the memory 204, input/output module 208 and/or any other component of circuitry 200, such as via a bus. Communications module 206 may be configured to use one or more communications protocols such as, for example, short messaging service (SMS), Wi-Fi (e.g., a 802.11 protocol, Bluetooth, etc.), radio frequency systems (e.g., 900 MHz, 1.4 GHz, and 5.6 GHz communication systems), infrared, GSM, GSM plus EDGE, CDMA, quad-band, and other cellular protocols, VOIP, or any other suitable protocol Input/output module 208 may be in communication with processor 202 to receive an indication of an input and/or to provide an audible, visual, mechanical, or other output. In that sense, input/output module 208 may include means for performing analog-to-digital and/or digital-to-analog data conversions. Input/output module 208 may include support, for example, for a display, touch screen, keyboard, button, click wheel, mouse, joystick, an image capturing device, microphone, speaker, biometric scanner, and/or other input/output mechanisms. In embodiments where circuitry 200 may be implemented as a server or database, aspects of input/output module 208 may be reduced as compared to embodiments where circuitry 200 may be implemented as an end-user machine or other type of device designed for complex user interactions. In some embodiments (like other components discussed herein), input/output module 208 may even be eliminated from circuitry 200. Alternatively, such as in embodiments wherein circuitry 200 is embodied as a server or database, at least some aspects of input/output module 208 may be embodied on an apparatus used by a user that is in communication with circuitry 200. Input/output module 208 may be in communication with memory 204, communications module 206, and/or any other component(s), such as via a bus. Although more than one input/output module and/or other component can be included in circuitry 200, only one is shown in FIG. 2 to avoid overcomplicating the disclosure (e.g., like the other components discussed herein).

In some embodiments, transaction module 210 may also or instead be included and configured to perform the functionality discussed herein related establishing transaction sessions. For example, when transaction module 210 is in a consumer device 106, transaction module 210 may be configured to perform the functionality related to communication with the merchant device discussed herein. When transaction module 210 is in a merchant device 108, transaction module 210 may be configured to perform the functionality discussed herein related to communication with the consumer device and/or system 102. In another example, when transaction module 210 is in a server 114 or other portion of system 102, transaction module 210 may be configured to perform the server-side processes related to facilitating the transaction session, such as providing for consumer accounts and related data, secure communications via wallet identifying data, payments, and/or among other things. In some embodiments, some or all of the functionality of transaction module 210 may be performed by processor 202. In this regard, the example processes and algorithms discussed herein can be performed by at least one processor 202 and/or transaction module 210. For example, non-transitory computer readable storage media can be configured to store firmware, one or more application programs, and/or other software, which include instructions and other computer-readable program code portions that can be executed to control processors of the components of system 200 to implement various operations, including the examples shown herein. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components and circuitry. Below is a discussion of an example process flowcharts describing functionality that may be implemented by one or more components discussed above. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 202, to produce a machine, such that the computer program product includes the instructions which execute on the computer or other programmable data processing apparatus to create a means for implementing the functions specified in the flowchart block or block diagrams.

These computer program instructions may also be stored in a computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

Transaction Sessions

FIG. 3 shows a flowchart of an example method 300 of establishing a transaction session in according to some embodiments. Method 300 is discussed as being performed by a consumer device (e.g., consumer device 106), a merchant device (e.g., merchant device 108), and a central system (e.g., server 114, database 116 and/or central system 102). However, in some embodiments, other suitable structures that can be suitably configured to perform method 300 can be used including devices, apparatuses, communication beacons, and/or among other things.

Method 300 may begin at 1302, where a consumer device may be configured to provide payment data to a central system. For example, consumer device 106 may be configured to provide payment data for making a payment to central system 102 via network 104. The payment data may include any suitable type of data that can be used to perform a financial transaction including credit card data (e.g., card number, expiration, card verification number, etc.), debit card data, check data, financial account data (e.g., account and/or routing number), electronic payment data (e.g., PayPal), and/or among other things.

In some embodiments, the payment data may be stored at central system 102 for subsequent use by consumer device 106, such as within database 116. For example, upon a consumer providing applicable login data for access to a consumer account, central system 102 may receive the payment data. Central system 102 may further be configured to facilitate payments (e.g., within the same session or a subsequent session) with the payment data, thereby allowing consumer device-based payments as discussed herein. The payment data may be stored in association with a consumer account that is provided by central system 102 along with other consumer data. Some examples of other consumer data may include consumer identifying data (e.g., name, account number, profile data, consumer image data, etc.), login data (e.g., account name, password, etc.), redeemable promotion data indicating promotions that the consumer can redeem at merchant shops, etc.

At 304, the central system may be configured to generate wallet identifying data. "Wallet identifying data," as used herein, may refer to any type of data that may be used to secure data transfers between the consumer device and the merchant device while still enabling the consumer device to cause the merchant device to receive secure information about the consumer (and/or the consumer account) from the central system. For example, the wallet identifying data may include, or may be based at least partially on, a random code, token, and/or key generated by the central system that is associated with the consumer account of the consumer. Central system 102 may be further configured to associate the wallet identifying data with the consumer account, such as with consumer identifying data. In some embodiments, each piece of wallet identifying data sent to the consumer device at 304 may include a wallet identifying token and an associated private key.

In some embodiments, some or all of the messages sent by the consumer device to the merchant device may include and/or be signed with the wallet identifying data. The wallet identifying data and/or messages signed with wallet identifying data, if intercepted or otherwise downloaded by an unauthorized device, will not reveal consumer data, merchant data, financial information, and/or content of messages in some embodiments. Furthermore, messages that are signed with the wallet identifying data (e.g., the wallet identifying data, such as the private key, is appended or otherwise included with the message) may be used to identify the message sender and/or to authenticate the message sender (e.g., to prove that the sender is the identified correctly). In some embodiments, some or all of the messages sent by the merchant device to the consumer device may include and/or be signed with merchant identifying data. Merchant identifying data may include, or may be based at least partially on, a random code generated by the central system that is associated with an account (e.g., a payment account, bank account, credit card account, savings account, etc.) of the merchant.

In some embodiments, the wallet identifying data may be used for sending consumer data, identifying the consumer account associated with the consumer device, signing messages by the consumer device that demonstrate consumer consent (e.g., for a payment), proving the authenticity of the message, and/or encrypting messages to ensure that the messages remain secure. The wallet identifying data may in some example embodiments include one or more tokens generated by the central system. Furthermore, the wallet identifying data may be sent to the consumer device at virtually any time. For example, wallet identifying data may be sent to a consumer device when the consumer creates a payment account via the consumer device, logs in to the payment account via the consumer device, on a scheduled basis (e.g., each day, each hour, each month, etc.), in the course of a transaction, or the like.

Additional details regarding the wallet identifying data for securing communications between a consumer device and merchant device, applicable in some embodiments, are discussed in U.S. patent application Ser. No. 13/754,753, titled "Consumer Device Payment Token Management," filed Mar. 13, 2013, U.S. patent application Ser. No. 13/801,610, titled "Wallet Consumer Presence Based Deal Offers," filed Oct. 17, 2012, and U.S. patent application Ser. No. 13/801,520, titled "Peer-to-Peer Payment Processing, filed Mar. 13, 2013, each are which are incorporated by reference in their entirety and for all purposes.

At 306, the central system may be configured to provide the wallet identifying data to the consumer device. For example, central system 102 may be configured to provide the wallet identifying data to consumer device 106 via network 104. Additional details regarding the management and use of wallet identifying are discussed in U.S. patent application Ser. No. 13/754,753, titled "Consumer Device Payment Token Management," incorporated by reference above.

At 308-312, the consumer device and the merchant device may be configured to form a connection. In some embodiments, the connection may be formed without the consumer device and/or the merchant device having active Internet access at the time of the connection (e.g., an active connection to the one or more public servers). For example, the connection may be a wireless connection over a personal area network (e.g., via PAN network 110 shown in FIG. 1).

Depending on the protocol used, at 308, the consumer device may begin announcing a transaction session service to other devices, such as the merchant device. For example, a process and/or application may execute on and configure the consumer device to broadcast (e.g., via Bluetooth) one or more suitable messages. In some embodiments, the consumer device may be configured to provide a user interface that allows the consumer to enable or disable the announcing of the transaction session service.

In some embodiments, the transaction session service may include one or more background processes that may run while the consumer device is locked, in a low-power mode, and/or executing other applications in the foreground. In some embodiments, the one or more broadcasted messages may include the wallet identifying data and/or other data encrypted using the wallet identifying data.

At 310, the merchant device may begin discovering the transaction session service. For example, a process and/or application may execute on the merchant device that configures the merchant device to discover other devices, such as the consumer device, that are currently announcing the transaction session service.

In some embodiments, the consumer device may be configured to discover the transaction session service while the merchant device may be configured to announce the transaction session service. Additionally and/or alternatively, both devices may be configured to be capable of announcing and discovering the transaction session service. For example, both devices may discover compatible devices and/or be discovered by compatible devices.

At 312, a connection between the merchant device and the consumer device may be created. The connection may be a direct wireless connection (e.g., including no intervening devices, switches, routers, networks, etc.), such as a personal area network (PAN) connection. For example, the consumer device and merchant device may come within a certain discovery range (e.g., 10 meters for Bluetooth), such as when a consumer carrying the consumer device enters the merchant's shop while transaction session discovering and/or announcement is enabled. In some embodiments, the discovery range may be set by the merchant device and/or the consumer device and/or by the range at which the devices can be located from each other and still be able to communicate (such as when Bluetooth and/or other direct connect wireless technology is used). In some embodiments, one or more communication beacons may be used for presence detection of one or more consumer device. Additional details regarding consumer device beacons, applicable in some embodiments, are discussed in U.S. Provisional Patent Application No. 61/883,846, titled "Systems and Methods For Programmatically Grouping Consumers," filed Sep. 27, 2013, which is incorporated by reference herein in its entirety and for all purposes.

Figure 7:
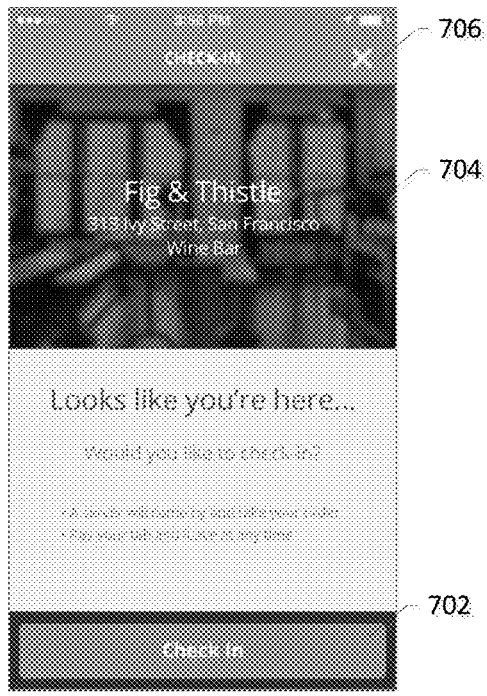

FIG. 7 shows an example check-in interface 700 that may be presented on the consumer device in connection with the transaction session in accordance with some embodiments. Check-in interface may be shown on the consumer device, such as based on the consumer selecting a particular merchant from a listing of merchants and/or based on the location of the consumer device (e.g., using wireless PAN 110 presence detection, a global positioning system, and/or cell tower triangulation, etc.). Check-in interface 700 may include check-in button 702. In response to the consumer selecting check-in button 702, the consumer device may be configured to begin announcing and/or discovering the transaction session service. Check-in interface 700 may further include merchant indicator 704 that may include merchant identifying data, which may be provided to the consumer device by the central system (e.g., via network 104) and/or the merchant device (e.g., via PAN network 110).

At 314, the consumer device may be configured to send the wallet identifying data to the merchant device. In some embodiments, the consumer device may send the consumer's name, URL for accessing the image data representing a picture of the consumer (e.g., as associated with the consumer account), the image data itself, and/or other suitable consumer identification information. In some embodiments, the wallet identifying data may include a wallet identifying token. For example, at least one of one or more wallet identifying tokens that the consumer devices received from the central system at 306 may be sent to the merchant device at 314.

In some embodiments, the wallet identifying data may include and/or provide a reference to consumer data stored in the one or more databases (e.g., database 116). As such, the wallet identifying data may be sent to the merchant device in place of actual consumer data that may be readily stolen by an unauthorized device within wireless communicable range. In some embodiments, the consumer device may send the consumer's name, the image data (or URL) and/or a consumer account identifier (e.g., as used by central system 102) to the merchant device without including and/or using any wallet identifying data.

At 316, the merchant device may be configured to send the wallet identifying data received from the consumer device at 314 to the central system. For example, the wallet identifying data may be sent via a secure connection between the merchant device and server 114, such as via network 104. As discussed above, the wallet identifying data may include data that identifies the consumer and/or the consumer account associated with the consumer. In some embodiments, the wallet identifying data may be a wallet identifying token. Here, the associated private key is not sent with the wallet identifying token.

At 318, the central system may be configured to validate the consumer, such as by using the wallet identifying data. For example, the central system may determine whether the wallet identifying data sent to the consumer device at 306 matches or otherwise corresponds with the wallet identifying data received from the merchant device at 316. In that sense, the central system may ensure that the wallet identifying data received from the merchant device at 316 originated from the consumer device (e.g., at 314) that is authorized to use the consumer account. Additionally and/or alternatively, the central system may further be configured to extract some or all of the consumer information (e.g., the consumer's identity) from the wallet identifying data (e.g., by using a private key that correspond with a wallet identifying token). Here, generating the wallet identifying data at 304 may include generating the wallet identifying data using on an algorithmic transformation based on at least consumer data and/or consumer identifying data.

At 320, the central system may be configured to send consumer information and/or other types of consumer identifying data to the merchant device. In that sense, the merchant device may be configured to determine the consumer identifying data. In some embodiments, the consumer data may be stored in the one or more databases (e.g., database 116). Server 114 may be configured to request the consumer information based on the wallet identifying data received from the merchant device at 316. The consumer information may include, for example, image data representing a picture of the consumer, payment account data, third party account data, purchase history data, user profile data, social network data, consumer preference data, and/or among other things.

In some embodiments, such as when the communication session between the merchant device and the consumer device is unsecured with wallet identifying data, the consumer device may be configured to directly send some or all of the consumer identifying data to the merchant device (e.g., via PAN network 110). In some embodiments, the consumer device may be configured to send a request for the consumer identifying data to be sent to the merchant device to central system 102 via network 104. Central system 102 may be configured to, in response to receiving the request, provide the consumer identifying data to merchant device 108 via network 104. For example, this technique could be used when the consumer device detects that a PAN network 110 is unavailable but network 104 is available. As such, the merchant device may be considered to determine the consumer identifying data in one or more ways, which may depend on the type of connections that are available between the merchant device and the central system and/or the merchant device and the consumer device. In some embodiments, the consumer identifying data may be determined by being entered on the merchant device through a user input device (e.g., a touch screen, keyboard, touchpad, etc.) by a merchant.

At 322, the consumer device may be configured to send a request to initiate a transaction session between the merchant device and the consumer device. The transaction session may trigger the creation of a transaction account, a temporary "shopping cart" or "tab" with which items (e.g., products, service(s), experiences, menu items, etc., depending on the applicable business of the merchant) may be associated for purchase by one or more consumers. For example, the request may be sent via PAN network 110 using the connection established at 308-312. Similarly, the merchant device may be configured to wirelessly receive the request from the consumer device to initiate a transaction session between the merchant device and the consumer device. In some embodiments, the consumer device may be configured to provide a display and/or interface that allows the consumer to determine when and/or if the request to initiate the transaction session will be sent.

Figure 8:

FIG. 8 shows an example transaction session request interface 800 that may be presented on the consumer device in connection with the transaction session in accordance with some embodiments. In some embodiments, in response to consumer selecting check-in selection 702 in check-in interface 700, the consumer device may be configured to provide a display of transaction session request interface 800 to a display of the consumer device. Transaction session request interface 800 may be provided to the consumer device when the consumer device has not provided payment data to the central system as indicated by payment data status indicator 804. Transaction session request interface 800 may include initiate tab button 802. In response to selecting the consumer selecting initiate tab button 802, the consumer device may be configured to allow the consumer to provide payment data (e.g., as discussed at 302) and/or request the initiation of the transaction session. In that sense, the order of some or all of the steps shown in the flowcharts herein may be different from those shown. In some embodiments, transaction session request interface 800 may further include wireless PAN connection status indicator 806 indicating that the consumer device has successfully connected with the merchant device at 312. The lack of an active wireless PAN connection may also be indicated by the consumer device, as shown at PAN connection status indicator 706 of check-in interface 700 in FIG. 7.

Figure 9:
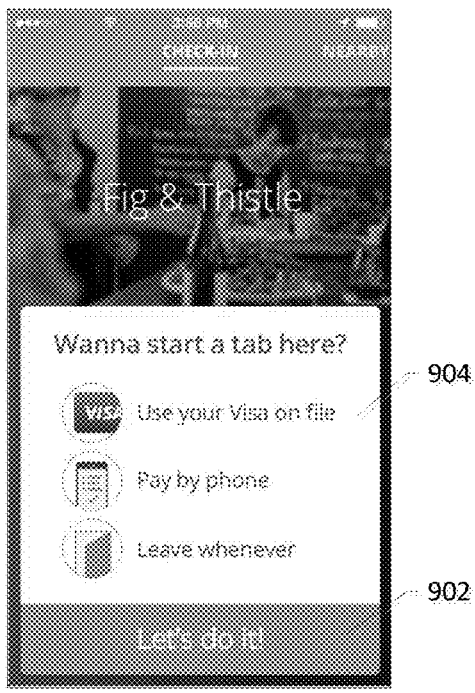

FIG. 9 shows an example transaction session request interface 900 that may be presented on the consumer device in connection with the transaction session in accordance with some embodiments. In some embodiments, in response to consumer selecting check-in selection 702 in check-in interface 700, the consumer device may be configured to provide a display of transaction session request interface 900 to a display of the consumer device. Transaction session request interface 900 may be provided to the consumer device when the consumer device has successfully provided payment data to the central system as indicated by payment data status indicator 904. Transaction session request interface 900 may include initiate tab button 902. In response to selecting the consumer selecting initiate tab button 902, the consumer device may be configured to request the initiation of the transaction session.

In some embodiments, the merchant device may be configured to forego initiating the transaction session when the consumer identifying data is first determined (e.g., at 320) until receiving the request from the consumer device to initiate the transaction session at 322. For example, a plurality of consumer devices may enter communicable range of the merchant device and the connection at 312 may be established between the merchant device and each of the consumer devices. Some of the consumers may be interested in starting a transaction account and/or otherwise initiating a financial transaction. Other consumers, for example, may be part of the same group or party and may not want to initiate their own transaction account. In some examples, a second consumer device may be configured to join an existing transaction session initiated by the (e.g., first) consumer device at 322, as discussed in greater detail in method 500 and shown in FIG. 5. In another example, a second consumer may prefer to simply be a member of an existing transaction without their consumer device being joined to the session. In that sense, by initiating the transaction session in response to receiving the consumer device request (e.g., and not prior to that), consumers at the merchant shop may self-serve and/or self-specify the organization of group membership and engage the merchant accordingly when desired.

In some embodiments, the transaction session may be established without an explicit request from the consumer device. For example, the transaction session may be automatically and/or programmatically established after 312 when the connection is established between the merchant device and consumer device and/or after 320 when the merchant device has received and/or otherwise determined consumer identifying data.

At 324, the merchant device may be configured to create a transaction account. For example, the transaction account may be created in response to receiving the request from the consumer device at 326. In some embodiments, creating the transaction account may include generating a transaction account identifier that uniquely identifies the transaction account from other transaction account (e.g., that are simultaneously open and/or have been previously opened and/or closed).

At 326, the merchant device may be configured to establish the transaction session between the consumer device and the merchant device. For example, the transaction session may be a persistent session that remains open for a period of time, such as until the end of the consumer and merchant interaction and/or subsequent to the consumer device being no longer detected by the merchant device via a direct wireless proximity-based connection. In some embodiments, while the transaction session remains established or open, the consumer device and the merchant device may be configured to perform various (e.g., two-way) communications to facilitate consumer service as discussed greater detail in method 400 and FIG. 4. The communication within the transaction session between the consumer device and merchant device may include wireless communications via PAN 110.

At 330, the merchant device may be configured to associate the consumer identifying data with the transaction account. For example, the consumer identifying data received at 320 and/or otherwise determined by the merchant device may be associated with the transaction account identifier created at 324.

Figure 10:
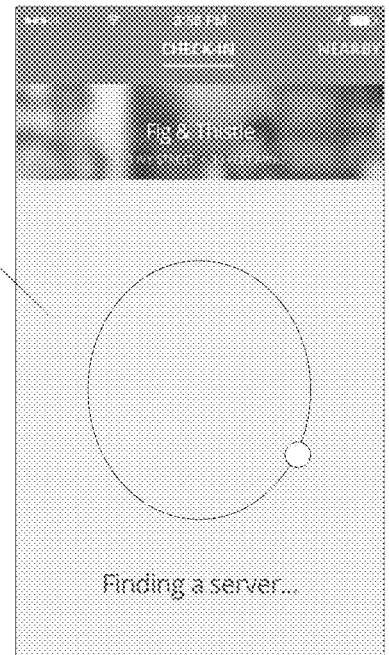

In some embodiments, the merchant device may be configured to determine an employee (or "merchant"), member of the wait staff, or "server" (e.g., as shown in FIG. 10) and associate the transaction account and/or transaction session with the determined merchant employee. "Employee," as used herein, refers to a human agent associated with the merchant and may include paid employees as well as contractors, business owners, etc. In some embodiments, the employee may be selected based on a particular capability, skill, occupational role, and/or expertise. In some embodiments, the consumer device may be configured to select the employee from a plurality of available employees. Additional details regarding the matching of a merchant employee to a consumer are discussed in U.S. patent application Ser. No. 13/797,264, titled "Employee Profile with Wallet," filed Mar. 12, 2013, which is incorporated by reference herein in its entirety and for all purposes.

FIG. 10 shows an example merchant search display 1000 that may be presented on the consumer device in connection with the transaction session in accordance with some embodiments. Merchant search display 1000 may be shown in the consumer device to indicate to the consumer that a merchant employee is being assigned to the consumer, such as by the merchant device and/or central system. As such, merchant search display 1000 may include merchant search status indicator 1002. In some embodiments, a merchant shop may include a plurality of merchant employees, each of which may be associated with a different merchant device. Once a merchant employee is matched to the consumer and the tab and/or transaction session, consumer identifying data of the consumer may be shown on the display device of a particular merchant device of the matched employee. Returning to FIG. 3, method 300 may then end, thereby establishing a transaction session between the merchant device and the consumer device.

FIG. 4 shows a flowchart of an example of a method 400 of facilitating consumer and merchant interactions within a transaction session in accordance with some embodiments. Method 400 may be performed, for example, after method 300 when the transaction session has been established. In that sense, the communications discussed between the consumer device and merchant device may be wirelessly sent and received via PAN network 110. In some embodiments, one of more of the communications may alternatively or additionally be performed between the consumer device and one or more communication beacons. Here, a communication beacon may be further configured to communicate with the merchant device (e.g., including point-of-sale functionality), such as through a wired and/or wireless connection (e.g., PAN network 110 and/or network 104).

At 402, the merchant device (and/or a communication beacon) may be configured to wirelessly poll the consumer device for presence of the consumer device. For example, merchant device 108 may be configured to wirelessly poll consumer device 106 to determine whether the consumer device is within a communicable range of PAN network 110. The polling may be a request for response data sent by the merchant device. In response to receiving the request, the consumer device may be configured to respond with applicable response data. In some embodiments, the consumer device may be configured to initiate the sending of data to the merchant device for the polling. Here, the merchant device may be configured to determine that the consumer device is within the presence of PAN network 110 based on receiving the data, such as at predetermined periods of time within the transaction session via synchronization between the consumer device and the merchant device. In some embodiments, the polling may be performed by one or more communication beacons and/or merchant devices strategically located within the merchant shop to provide a web of consumer device presence detection. PAN network 110 may include each of the direct wireless connections provided by each of the one or more beacons and/or one or more merchant devices.

At 404, the merchant device may be configured to associate the transaction account and/or transaction session with a unit of location. For example, the unit of location may be a table, seat, room, area, etc. of a dine-in restaurant where the consumer may be seated and where the consumer device may be located. In some embodiments, the unit of location may be determined by the merchant device, such as based on group size and/or unit of location availability (e.g., reservations, unavailable tables, etc.). In some embodiments, such as where consumer self-seating is used, the unit of location may be determined based on determining the location of the consumer device. For example, one or more communication beacons and/or merchant devices may be disposed within the merchant shop that can be used to locate (e.g., via received signal strength indication, triangulation, signal time-of-flight determination, etc.) the consumer device and/or otherwise match the consumer device to the nearest unit of location.

At 406, the merchant device may be configured to send menu data and/or merchant data to the consumer device. For example, the merchant data may include merchant identifying data, and/or other data, that indicates the merchant's identity to the consumer device. The menu data may include items offered for sale at a restaurant, associated descriptions, associated prices, and/or among other things. The merchant data and/or menu data may further include items for sale (e.g., products, services, etc.) by the merchant. In some embodiments, the merchant data may further include information about the merchant, such promotional offerings, sales, etc. In response to receiving the merchant and/or menu data, the consumer device may be configured to display the menu data (e.g., as part of a consumer interface associated with the transaction session) on a display of the consumer device.

At 408, the consumer device may be configured to send order data indicating one or more items. The one or more items may include items to be added to the transaction account selected by the consumer via the consumer device.

At 410, the merchant device may be configured to associate one or more items with the transaction account and/or transaction session. For example, for a dine-in restaurant merchant, one or more menu items may be added, removed, customized (e.g., adding and/or removing various ingredients of a restaurant menu item), among other things, to the transaction account based on the order data received from the consumer device at 408.

Alternatively or additionally, the merchant device may be configured to associate the one or more menu items with the tab and/or transaction session based on merchant entry via a user input device (e.g., touchscreen, touchpad, mouse, keyboard, etc.) of the merchant device. Here, a merchant may take a consumer's order and assist the consumer in generating the order data. Where the merchant device is a mobile device, it may be carried to the applicable unit of location where the merchant is seated with the unit of location being displayed on the merchant device display to assist the merchant.

FIG. 15 shows an example of a tab display 1500 that may be displayed on the merchant device in accordance with some embodiments. Tab display 1500 may be used by a merchant to add, remove, and/or modify items (e.g., menu items) from the transaction account. Tab display 1500 may include informational displays that in some embodiments may be selectable to access additional related data and/or functionality, such as unit of location (e.g., table) identifier 1502, server identifier 1504, group information 1506, and seating status information 1508. Furthermore, restaurant tab display 1500 may include selectable menu list 1510, configured to allow the merchant to select one or more menu items for association with the tab. An example menu item is Chicken and Waffles, shown at 1512 with associated price data. Selected menu items may be indicated at ordered items display 1514. In some embodiments, items entered within ordered items display 1514 may be sent to the consumer device via PAN network 110 within the transaction session, such as in real-time when each item is entered and/or in response to the merchant selecting send button 1516. Additionally or alternatively, in response to the merchant selecting send button 1516, the merchant device may be configured to send the ordered items to a ticket printer and/or kitchen display for item preparation. In some embodiments, the consumer device interface may be configured to provide an interface similar to tab display 1500 for the addition of items to the transaction account by the consumer.

At 412, the merchant device may be configured to send an indication of the transaction account including the one or more items associated with the transaction account account to the consumer device. For example, the indication of the transaction account may include a display of items that can be shared in real-time as each item is entered, removed, updated, etc. by the merchant and/or otherwise associated with the transaction account, such as consumer selection via the consumer device. Where items are added via consumer device, an indication of the transaction account including the items may also be sent via PAN network 110 to the merchant device. In some embodiments, both techniques may be used (e.g., simultaneously) such that both the merchant and consumer can update the transaction account and view the updates of the other (e.g., in real-time).

Figures 11, 12, 13, 14:
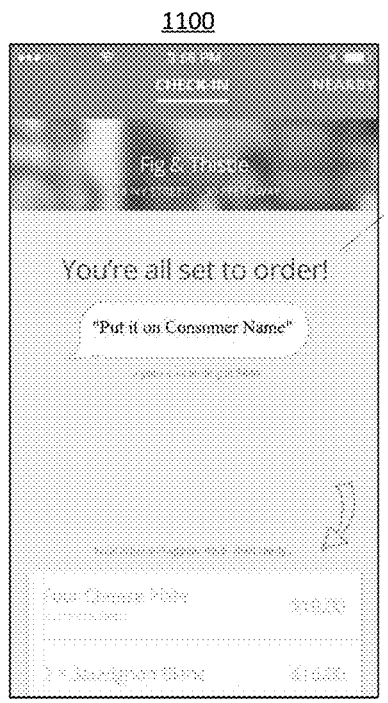

FIG. 12 shows an example of a consumer tab display 1200 in accordance with some embodiments. Consumer tab display 1200 may be provided to a display of the consumer device. Consumer tab display may include tab indicator 1202 configured to provide a visual indication of the tab including the one or more menu items 1204 associated with the tab. Consumer tab display 1200 may further include and predetermined tip amount 1206 (e.g., which may be predefined by via the consumer device and/or merchant device), and total cost 1208. Where a promotion and/or other discount is being applied to the total cost, the value of the promotion (e.g., a redemption value) and/or discount may also be shown in consumer tab display 1200.

At 414, the consumer device may be configured to send a request for service from the merchant device. Accordingly, the merchant device may be configured to receive the request via PAN network 110. In some embodiments, the request may include request data indicating the nature of the assistance. For the example of a dine-in restaurant, the request data may indicate that the consumer would like a merchant employee or server to provide a particular type of assistance (e.g., ordering, requesting drinks, utensils, napkins, closing the tab, etc.) and/or to provide a service at a particular unit of location.

At 416, the merchant device may be configured to process the request. For example, the request may be displayed on the display of the merchant device to alert the merchant (or applicable merchant employee) accordingly. Where the request is for a modification to the transaction account, the merchant device may be configured to process the request by recalculating a total cost, sending the order to a ticket printer and/or kitchen display for item preparation, allowing the merchant to close out a particular request after it has been fulfilled, among other things.

At 418, the merchant device may be configured to send a request confirmation to the consumer device. For example, the request confirmation may indicate that the request has been received by the merchant, that the request is being processed by the merchant, and/or that the request has been fulfilled. In some embodiments, the merchant device may be configured to send a plurality of confirmations to the consumer device, such as in real-time as the request is received, processed, and/or fulfilled to completion via PAN network 110.

At 420, the merchant device may be configured to determine a total cost associated with the transaction account and/or transaction session. The total cost may be determined based on the one or more items associated with the transaction account and their associated prices. In some embodiments, the total cost may further include a tax amount, service costs, warranties, and/or tip amount. The total cost further include one or more applicable deductions based on a redeemed deal voucher, reward, discount, sale, store credit, and/or other promotion. In some embodiments, the merchant device may be configured to receive promotion data (or deal data) associated with a discount. For example, the promotion data may be received from the consumer device via PAN network 110 and/or central system via network 104. As such, the merchant device may be configured to apply the discount to the total cost based on the promotion data. In some embodiments, the total cost may be part of transaction data that also includes a transaction ID (a unique number or code generated by the merchant device for each transaction) and/or a merchant ID (a unique number or code associated with each merchant by the central system).

At 422, the merchant device may be configured to send the total cost to the consumer device. For example, the total cost may be sent by merchant device 108 to the consumer device 106 via network 114 for payment approval. The total cost may be displayed on the consumer device, such as shown by total cost 1208 in consumer tab display 1200.

At 424, the consumer device may be configured to determine a payment account. The payment amount may include the total cost and may further include any additional amount added to the total cost by the consumer, such as a consumer specified tip amount, and/or any amount subtracted from the total cost (e.g., promotion redemption, rewards, discounts, coupons, vouchers, etc.). In some embodiments, the consumer device may be configured to generate consumer approval data secured with wallet identifying data. The consumer approval data may provide an indication as to whether the consumer has approved payment of the total cost and/or payment amount. In some embodiments, some or all of the messages sent from the consumer device within the transaction session may include and/or be signed with the wallet identifying data (e.g., to create an electronic or digital signature). For example, the consumer approval data may be sent to the merchant device with wallet identifying data (e.g., as a signature) and/or be encrypted using the wallet identifying data received by the consumer device from the central system at 306.

FIG. 13 shows an example payment display 1300 in accordance with some embodiments. Payment display 1300 may be provided to a display of the consumer device while the transaction session is established. Payment display 1300 may include tab indicator 1302, total cost 1304, tip amount 1306, and payment amount 1308. Payment display 1300 may further include adjust tip button 1310 and payment method button 1312. Adjust tip button 1310 may allow the consumer to select a tip amount that is different from a predefined tip amount. The tip amount may be specified as a percentage of the total as shown and/or may be specified by a flat amount. Payment method button 1312 may be configured to allow the consumer to add and/or modify a payment method. Payment method button 1312 may include and/or be associated with an indication of at least a portion of the payment data that the consumer device provided to the central system at 302. When the consumer is satisfied with the payment amount, tip amount, and/or payment method, the consumer may select confirm payment button 1314. In response to the selection of confirm payment button 1314, in some embodiments, the consumer device may be configured to generate the consumer approval data and/or display a payment confirmation display.

FIG. 14 shows an example payment confirmation display 1400 in accordance with some embodiments. Payment confirmation display 1400 may be shown in the consumer device in response to the consumer selecting confirm payment button 1314 in payment display 1300. Payment confirmation display 1400 may include tab summary 1402, payment method button 1404, and payment confirmation button 1406. Tab summary 1402 may include a summary of the tab including items, item price, total cost, tip amount, and/or payment amount. Payment method button 1404 may allow the consumer to review the selected payment data and/or provide another opportunity to modify the payment data prior to confirmation. When the consumer is satisfied with the payment, the consumer may select payment confirmation 1406. In some embodiments, the consumer device may be configured to generate the consumer approval data and/or provide the consumer approval data to the merchant device via PAN network 110 (e.g., within the transaction session).

Returning to FIG. 4 and in some embodiments, sensitive or private information may be encrypted and/or secured while non-sensitive information may be shared unsecured. For example, communications involving consumer identifying data, order data, and/or consumer approval data may be secured and/or encrypted with the wallet identifying data. In some embodiments, such as where a near field communication, wired connection, etc. is used that provides enhanced security, the consumer approval data may not be secured. In some embodiments, the consumer approval data may alternatively or additionally include (e.g., secured or otherwise) payment data such as credit card data, debit card data, check data, financial account data, electronic payment data, and/or among other things.

At 426, the consumer device may be configured to send consumer approval data secured with wallet identifying data to the merchant device. For example, the consumer approval data may be sent via PAN network 110. The merchant device may be configured to send the consumer approval data to the central system (e.g., via network 104) to process the payment. The central system may decrypt and/or otherwise determine the payment amount and payment data associated with the consumer account (e.g., as received from the consumer device at 302 of method 300) based on the consumer approval data. The central system may be further configured to provide the applicable transaction data to a third party payment system (e.g., third party system 112) to complete the transaction. Alternatively, such as when the consumer approval data is not secured with a wallet identifying token, the merchant device may be configured to provide the consumer approval data and/or payment data to a third party system to complete the payment.

At 428, the merchant device may be configured to periodically poll the consumer device for presence. The discussion at 402 may be applicable at 428. For example, the polling may be performed at predetermined times (e.g., every 5 minutes) to determine whether the consumer device is within a communicable range of PAN network 110. In some embodiments, the merchant device may be configured to store the consumer approval data for facilitating the financial transaction for a duration of time prior to providing the consumer approval data to the central system and/or third party system. For example, while the transaction session is open, the merchant device may be configured to store the consumer approval data within a memory, database, and/or other storage device of the merchant device. As discussed in greater detail with respect to method 600 and FIG. 6, in some embodiments, the consumer approval data may be sent to the central system and/or third party system subsequent to the consumer device being failed to be detected as being within the presence of the merchant device and/or one or more communication beacons. Similarly, while the transaction session remains open, the merchant device may be configured to replace first consumer approval data with any second consumer approval data received within the same transaction session. Here, the second consumer approval data may be sent to the central system to facilitate a single payment while the first consumer approval data may be deleted, overwritten, not sent to the central system, and/or otherwise not used to facilitate a payment.

In that sense, the consumer may be allowed to modify the tab, request assistance, regenerate modified consumer approval data (e.g., change the payment amount and/or tip amount), and/or perform (and/or perform again) any of steps 404-426 and in various orders while the transaction session is opened. Payment may be predefined while the consumer device is within the presence of the merchant device and/or a communication beacon, and the consumer may be allowed to simply leave the merchant shop at the consumer's discretion, thereby triggering the (e.g., latest or only) predefined payment. Additional details regarding functionality that can be provided via communication between a merchant device and consumer device, applicable to some embodiments, are discussed in U.S. patent application Ser. No. 13/179,529, titled "Consumer Device Based Point-Of-Sale," filed Mar. 11, 2013, which is incorporated by reference herein in its entirety and for all purposes. Method 400 may then end.

FIG. 5 shows a flowchart of an example of a method 500 of closing a transaction session in accordance with some embodiments. For example, method 500 may be performed with methods 300 and 400 as a technique for completing a financial transaction in connection with the closing of the transaction session and based on consumer device presence detection.

Method 500 may begin at 502 and proceed to 504, where the merchant device and/or one or more communication beacons (e.g., in communication with a merchant device) may be configured to wirelessly poll the consumer device for presence. In some embodiments, some or all of the steps discussed herein as being performed by the merchant device may be performed by one or more dedicated communication beacons strategically located within the merchant shop to create a mesh of direct wireless connection coverage for PAN network 110. The dedicated communication beacons may include point-of-sale functionality and/or may be stripped down, low-cost communication beacons without point-of-sale functionality. At 504, the merchant device may be configured to determine whether the presence of the consumer device has been detected, such as at a first time. The discussion at 402 of method 400 may be applicable at 504 and 506.

In response to determining that consumer device presence has been detected, method 500 may return to 504, where the merchant device may be configured to wirelessly poll the consumer device for presence. In some embodiments, the polling of the consumer device may be performed at predetermined times, such as subsequent to the lapse of a predetermined duration of time at a second time. When the presence of the consumer device is detected, the transaction session may be kept open and the communications discussed above at 404-426 may be performed as discussed above, and the polling may continue at each predetermined time.

In response to determining that the consumer device presence has failed to be detected, method 500 may proceed to 508, where the merchant device may be configured to determine a transaction session closure time. The transaction session closure time may define a time at which the transaction session and/or transaction account may be closed such that no further communications or modifications to the transaction account may be permitted. In some embodiments, the transaction session closure time may be when the consumer device fails to be detected.

In some embodiments, the transaction session closure time may be at a subsequent time, such as a predetermined time after the consumer device presence has failed to be detected. The predetermined time of the transaction session closure time may be the same or different from the polling interval predetermined time discussed above. In that sense, the tab and/or transaction session may not be closed when at the first instance of failure to detect consumer device presence to account for consumer device movement (e.g., going to the restroom and/or location other than the unit of location that is not within the communicable range of wireless PAN 110), communication error, blind spots in network coverage, and/or among other things that do not indicate consumer intent to close the transaction session and/or tab.

At 510, the merchant device may be configured to wirelessly poll the consumer device at the transaction session closure time. At 512, the merchant device may be configured to determine whether the presence of the consumer device has been detected at the transaction session closure time. The discussion at 402 of method 400 may be applicable at 510 and 512.

In response to determining that consumer device presence has been detected at the transaction session closure time, method 500 may return to 504, where the merchant device may be configured to continue to wirelessly poll the consumer device for presence, such as subsequent to the lapse of a predetermined duration of time.

In response to determining that the consumer device presence has failed to be detected at the transaction session closure time, method 500 may proceed to 514, where the merchant device may be configured to close the transaction session and/or transaction account. For example, the transaction account and/or transaction session may be closed such that no further modification to the transaction account is allowed and/or no further communications within the transaction session is allowed. In the event that the consumer device presence is redetected, such as on a subsequent consumer visit, methods 300-500 may be performed again with a new tab and/or transaction session.

At 516, the merchant device may be configured to facilitate a financial transaction with the consumer approval data. For example, merchant device 108 may be configured to send the consumer approval (e.g., secured with wallet identifying) to central system 102 and/or to third party system 112. As discussed above, in some embodiments, multiple instances of consumer approval data may be created in a single transaction session. Here, the merchant device configured to facilitate a financial transaction with the consumer approval data may include the merchant device being configured to facilitate a financial transaction with the latest consumer approval data received prior to closure of the transaction session and/or transaction account. Alternatively or additionally, in some embodiments, the merchant device may close a transaction session based on either receiving consumer approval data or determining that the consumer device is not within the communicable range of the PAN based on the wireless polling (e.g., where consumer approval data is not received but the consumer has placed an order and/or received one or more items, products, services, etc. associated with the transaction account). Method 500 may then proceed to 518 and end.

FIG. 6 shows a flowchart of an example of a method 600 of facilitating consumer and merchant interactions within a transaction session for a plurality of consumers in accordance with some embodiments. The plurality of consumers may each be associated with a consumer device. In that sense, methods 300, 400, and 500 may be performed (e.g., simultaneously) between each consumer device and each merchant device where each consumer device is associated with a separate transaction session. Alternatively or additionally, as discussed in method 600, two or more consumer devices (e.g., associated with consumers belonging to a group) may be allowed to join a shared transaction session with the merchant device. In some embodiments, method 600 may be performed with one or more of methods 300, 400 and 500. In some embodiments, the communications between the merchant device and the second consumer device may be performed via PAN network 110.

Method 600 may begin at 602 and proceed to 604, where the merchant device may be configured to determine a second consumer identifying data associated with a second consumer device. For example, merchant device may determine consumer identifying data associated with each of a plurality of consumer devices within a communicable range of wireless PAN 110. The discussion at 302-320 of method 300 may be applicable at 604. The second consumer device may be associated with a second consumer that is different from the first consumer.

At 606, the merchant device may be configured to receive a request from the second consumer device to be added to an existing transaction account and/or transaction session. For example, the consumer device may be configured to provide a display of transaction accounts, consumers, and/or transaction sessions to a plurality of consumer devices having a connection with the merchant device (e.g., as may be established in accordance with method 300 at 308-312). Each transaction account, consumer, and/or transaction session may be identified based on associated consumer identifying data, such as consumer identifying data of the first consumer that initiated the transaction session. The second consumer may be allowed to select the applicable transaction account, consumer, and/or transaction session via the consumer device. In response, the second consumer device may be configured to send the request to be added to the existing transaction session to the merchant device.

At 608, the merchant device may be configured to associate the second consumer device with the tab and/or transaction session including the merchant device and the (e.g., tab-initiating) consumer device. The transaction session may be further associated with a third consumer device, a fourth consumer device, and so forth. The association may be made in response to the request received from the second consumer device at 606.

In some embodiments, the merchant device may be configured to associate the second consumer device with the tab and/or transaction session based on merchant entry via an input device of the merchant device. For example, the second consumer may request that the merchant add the second consumer to the transaction session. The merchant device may include an interface showing consumer identifying data associated with each consumer device that has been detected. The merchant may then select the second consumer identifying data (e.g., based on consumer self-identification to the merchant) and the applicable tab and/or transaction session for association with the tab and/or transaction session.

FIG. 16 shows a connected consumer display 1600 in accordance with some embodiments. Connected consumer display 1600 may be shown on the merchant device in connection with the establishment of a transaction session. Consumer display 1600 may include consumer identifying data 1602 for each consumer that is associated with a consumer device that is detected and/or otherwise connected with the merchant device (e.g., as discussed at 308-312 of method 300) and/or that has an established transaction session. For each consumer, consumer data may also be shown to facilitate service such as favorites, allergies, unredeemed promotions, and/or available rewards, and/or among other things.

FIG. 11 shows an example tab synchronization display 1100 in accordance with some embodiments. Tab synchronization display 1100 may be shown on the display of the consumer device to facilitate merchant entry of items to the tab. In some embodiments, tab synchronization display 1100 may be provided in response and/or subsequent to the consumer selecting initiate tab button 902 in transaction session request interface 900. Tab synchronization display 1100 may include consumer identifying message 1102 indicating how the consumer can self-identify with the merchant. For example, a consumer carrying the consumer device may state "Put it on Consumer Name," as shown in consumer identifying message 1102. With reference to FIG. 16, the consumer identifying data 1602 of the applicable consumer identified by "Consumer Name" 1604 may be shown in connected consumer display 1600. In some embodiments, the merchant may select the applicable consumer identifying data 1602. In response to the selection of the applicable consumer identifying data 1602, the merchant device may be configured to provide a tab display associating items with the tab and/or transaction session, such as tab display 1500 shown in FIG. 15.

At 612, the merchant device may be configured to determine a respective payment amount associated with each consumer. For example, the respective payment amount may be based on the order data received from each consumer device within the transaction session as discussed at 408 of method 400. In another example, the merchant may be allowed to split the tab as suitable via the merchant device and the merchant device. In a third example, each consumer may be allowed to select one or more items associated with the tab for payment by each respective consumer via the consumer device.

At 614, the merchant device may be configured to wirelessly send the respective payment amount to each respective consumer device. The discussion at 422 of method 400 may be applicable at 614. Each consumer device may then allow each consumer to preset a payment amount based the each respective payment amount as discussed at 424 and 426 of method 400. Similarly, the merchant device may be configured to facilitate payments based on polling each consumer device for presence as discussed in method 600. Method 600 may then proceed to 616 and end.

FIG. 17 shows a flowchart of an example of a method 1700 of facilitating a transaction session with a central system in accordance with some embodiments. For example, some or all of the functionality of the merchant device discussed herein in methods 300-600 may be performed by one or more servers of a central system, such as server 114 of central system 102. In some embodiments, the central system may serve as an intermediary for the exchanges of data within a transaction session between a consumer device and a merchant device. For example, central system 102 may communicate with each of merchant device 108 and consumer device 106 via network 104.

Method 1700 may begin at 1702 and proceed to 1704, where one or more servers may be configured to receive a request to initiate a transaction session from a consumer device. For example, consumer device may be configured to send the request to the one or more servers of system 102 via network 104. In some embodiments, the consumer device may provide a transaction session request interface 800 or 900 as shown in FIGS. 8 and 9 that allows the consumer to generate the request.

At 1706, the one or more servers may be configured to determine a merchant device for establishing the transaction session with the consumer device. The central system may be configured to determine the merchant device from a plurality of merchant devices, which may associated with a single merchant or multiple different merchants and/or merchant locations (e.g., where a merchant has multiple merchant shop locations). The merchant device may be determined based on any suitable technique.

In some embodiments, the central system may be configured to determine the applicable merchant and/or merchant device for establishing the transaction session based on determining a merchant proximity score for the consumer device. A "merchant proximity score," as used herein, refers to a score, rating, value, etc. that indicates whether the consumer device is considered to be at and/or near the merchant, a merchant device of the merchant, and/or a communication beacon of the merchant. For example, the merchant proximity score may be determined based on one or more types of location-indicative data. In some embodiments, the merchant proximity score may be scaled, such as from 0 to 100 (or 0 to 1, −1 to 1, 0 to 5, etc.) such that scores closer to or at 0 indicates the consumer device is highly unlikely or not at a particular merchant. In contrast, a score closer to or at 100 may indicate that the consumer device is highly likely or at a particular merchant. In some embodiments, the one or more servers may be configured to determine a merchant proximity score threshold. The merchant proximity score threshold may be set in accordance with the selected scale of the merchant proximity scores and may indicate, for example, the merchant proximity score that is needed in order for the consumer device to be deemed as being at a particular merchant. Returning to the example above of merchant proximity scores ranging from 0 to 100, the merchant proximity score threshold may set to 50 such that scores above 50 indicate that the consumer device is at the merchant while scores below 50 may indicate that the consumer device is not at the merchant. The one or more servers may be further configured to determine whether the merchant proximity score exceeds the merchant proximity score threshold. In response to determining that the merchant proximity exceeds the merchant proximity score threshold, the one or more servers may be configured to determine the consumer device as being at the merchant, and thus also the applicable merchant device for establishing the transaction session. In response to determining that the merchant proximity exceeds the merchant proximity score threshold, the one or more servers may be configured to determine the consumer device as being not at the merchant (or no longer at the merchant). As discussed above, in some embodiments, the consumer device may be polled for location and/or presence detection. Here, the results of the polling can be used to determine the merchant proximity score, and in some embodiments, close the transaction session and/or transaction account, and/or facilitate a financial transaction as discussed above in method 500 and FIG. 5.

In some embodiments, the merchant proximity score may be determined based on the consumer device providing wallet identifying data (and/or other communication) to the merchant device and/or a communication beacon (e.g., at 314 of method 300) via a wireless direct connection and/or personal area network (PAN) (e.g., a Bluetooth connection) and then the merchant device providing the wallet identifying data to the central system (e.g., at 316 of method 300). Additionally or alternatively, in some embodiments, the merchant proximity score may be determined based on the location of the consumer device being sent from the consumer device to the central system. Here, the consumer device and/or central system may be configured to determine the location of the consumer device based on global positioning system (GPS) location tracking, internet protocol (IP) address, cell-tower triangulation, and/or among other things. The central system may then compare the location of the consumer device with known locations of merchants and/or merchant shops to determine the merchant proximity scores, and then based on the scores, the particular merchant device for establishing the transaction session with the consumer device. In some embodiments, the one or more servers may be configured to determine a merchant proximity score based on weighting the various scores determined as discussed above. For example, a proximity based communication via the wireless direct connection and/or personal area network (PAN) may be more reliable than GPS coordinates, IP address tracking, and/or cell-tower triangulation. As such, an indication of the consumer device having performed the proximity based communication may be given greater weight. Similarly, scores based on GPS coordinates, IP address tracking, and/or cell-tower triangulation may be weighted in accordance with their precision or reliability. In some embodiments, such as where different consumer device location determination techniques produce conflicting results, the one or more servers may be configured to determine the merchant proximity score based on the most reliable and/or precise determination that is available.

In some embodiments, the merchant proximity score may comprise a binary value, such as 0 or 1, with 0 indicating that the consumer device is not at the merchant and 1 indicating that the consumer device is at a merchant. For example, where the consumer device presence is detected by a direct wireless connection or a PAN of a merchant device (and/or communication beacon) at the merchant location, the merchant proximity score may be determined as 1. Similarly, where GPS, triangulation, IP, and/or other remote communication (e.g., non-direct wireless such as via the Internet or network 104) between the consumer device and the one or more servers indicates that the consumer device is at a merchant, the merchant proximity score may be determined as 1. Here, the merchant proximity score threshold may be set at 1 such that a score that is less than 1 fails to exceed the merchant proximity score threshold. Furthermore, in some embodiments, the one or more servers may be configured to determine merchant proximity scores for the consumer device for each of a plurality of merchants, determine a ranking of the plurality of merchants based on the merchant proximity scores, and determine the merchant and/or merchant device based on the ranking (e.g., taking the highest ranked).

In some embodiments, the one or more servers may additionally or alternatively be configured to determine the merchant device based on consumer selection of a merchant. For example, the central system may be configured to provide a directory, listing, or other indication of selectable merchants and/or merchant locations to the consumer device for requesting the transaction session. The one or more servers may be further configured to, for example, access a database or directory of merchant devices associated with the merchant and select at least one of the associated merchant devices. In some embodiments, such as where a merchant or merchant shop includes a plurality of merchant devices, the central system may be configured to select a merchant device of the determined merchant. For example, each merchant device may be associated with a different employee, staff, location within the merchant shop (e.g., bar vs. table seating), and/or type of service (e.g., wait staff vs. customer support or management).

At 1708, the one or more servers may be configured to determine consumer identifying data associated with the consumer device. For example, the central system may be configured to associate the consumer identifying data with a consumer account and/or the consumer device. For example, the consumer device may be associated with the consumer account in response to receiving consumer account login data (or other identification and/or authentication data) associated with the consumer account from the consumer device. The consumer identifying data, as discussed above, may be associated with the consumer account and thus the one or more servers may determine the consumer identifying data.

At 1710, the one or more servers may be configured to provide the consumer identifying data to the merchant device. For example, the central system may provide the consumer identifying data to merchant device 108 via network 104. The discussion at 320 of method 300 may be applicable at 1710.

At 1712, the one or more servers may be configured to facilitate the transaction session between the consumer device and merchant device. For example, the one or more servers may be configured to perform some or all of the functionality discussed above for the merchant device in methods 300-600. For example, with respect to the discussion above of method 300, the central system may be configured to create a transaction account and establish the transaction session as an intermediary between the consumer device and the merchant device at 1712. The one or more servers may be further configured to associate the transaction session with the transaction session account and/or associate the consumer identifying data with the transaction account.

In some embodiments, one or more servers may be configured to facilitate the consumer and merchant interactions and/or point-of-sale functionality of the merchant device discussed above in connection with method 400. For example, the one or more servers may be configured to poll the consumer device for presence to the merchant based on the global positioning system (GPS) location tracking, internet protocol (IP) address, cell-tower triangulation, etc and/or determine merchant proximity scores based on the polling. The polling may be used to determine whether the consumer device is within a predetermined distance from and/or proximate to the merchant or merchant device and/or otherwise within the merchant shop. Additionally or alternatively, polling may be used to determine whether the consumer device is within a communicable range of a personal area network (PAN) of the merchant device and/or a communication beacon (e.g., located at the merchant shop). In that sense, some or all of the merchant device functionality discussed at 402 and 428 of method 400 and method 500 may be alternatively or additionally performed by the one or more servers at 1712.

In some embodiments, the one or more servers may further configured to facilitate point-of-sale functionality. For example, the one or more servers may receive order data indicating one or more items to be added to the transaction account from the merchant device and/or consumer device. Where the order data is received from the merchant device, the one or more servers may provide an indication of the order data and/or one or more items to the consumer device for display and/or consumer modification. Similarly, where the order data is received from the consumer device, the one or more servers may provide an indication of the order data and/or one or more items to the merchant device for display and/or merchant modification. In some embodiments, the one or more servers may be further configured to facilitate consumer and merchant interactions within a transaction session for a plurality of consumers, such as by performing one or more of the steps discussed above in connection with method 600 and FIG. 6.

In some embodiments, the one or more servers may be configured to provide inventory management on behalf of a merchant. For example, system 102 may be configured to store inventory data indicating the items (e.g., products, services, experiences) that are being offered by the merchant. The inventory data may be stored in database 116 and/or other memory, and accessed by server 114. In some embodiments, one or more servers of system 102 may be configured to generate a menu based on the inventory data and to provide the menu to the merchant device and/or consumer device within the transaction session. In some embodiments, the one or more servers may be further configured to update the inventory data based on transactions of the merchant, performed within a transaction session or otherwise. For example, the one or more servers may update the inventory data based on the item data generated within the transaction session indicating that a consumer has purchased a particular inventory. The one or more servers may then decrement the inventory data accordingly. In some embodiments, the one or more servers may be further configured to (e.g., in real-time) update the menu based on changes in the inventory data. For example, new items added to the merchant's inventory may also be added to the menu. In another example, when an item of the inventory has been sold out and/or is otherwise unavailable, the one or more servers may be configured to remove the item from the menu. In some embodiments, the merchant device may be configured to perform some or all of the inventory management functionality in alternative or addition to the one or more servers.

In some embodiments, subsequent to providing the consumer identifying data to the merchant device at 1710, the merchant device may be configured to facilitate the transaction session as discussed at 320-330 of method 300 and methods 400-600. Method 1700 may then proceed to 1714 and end.

Many modifications and other embodiments will come to mind to one skilled in the art to which the embodiments discussed herein pertain having the benefit of the teachings presented in the foregoing descriptions and the associated drawings. For example, although some examples discussed pertain to a dine-in restaurant or the like, the techniques discussed herein may be applicable to any type of merchant that offers products, experiences and/or services to consumers at a merchant shop. Therefore, it is to be understood that the embodiments contemplated herein are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus, comprising:
   circuitry configured to:
   generate wallet identifying data that is configured to secure data transfers between a consumer device and the apparatus, wherein the wallet identifying data is generated based on one of a random code, a random token, or a random key;
   associate the wallet identifying data with consumer identifying data;
   store the wallet identifying data to memory associated with the apparatus;
   wirelessly receive a validation request comprising an indication of the wallet identifying data from a consumer device;
   validate an identity of a consumer device user profile associated with the consumer device by comparing the indication of the wallet identifying data received from the consumer device as part of the validation request to the wallet identifying data stored to the memory associated with the apparatus;
   in a circumstance where the identity of the consumer device user profile is validated:
      retrieve the consumer identifying data based on the wallet identifying data and associate the consumer identifying data with the consumer device;
      receive a request from the consumer device to initiate a transaction session between a merchant device associated with a merchant and the consumer device; in response to receiving the request:
      establish the transaction session between the merchant device and the consumer device, and
      associate the consumer identifying data with the transaction session; and subsequent to initiating the transaction session:
         at each polling iterations of a plurality of polling iterations, wirelessly poll the consumer device by transmitting one or more polling requests associated with the polling iteration to the consumer device using one or more communication beacons installed within a merchant location associated with the merchant device to trigger a consumer-present response from the consumer device for the polling iteration, wherein wirelessly polling the consumer device during a polling iteration of the plurality of polling iterations comprises determining that the polling iteration has failed in response to determining that the consumer-present response for the polling iteration has not been received by the apparatus after transmitting a defined number of polling requests associated with the polling iteration, and wherein the defined number of polling requests for a polling iteration of the plurality of polling iterations is determined based on a non-response tolerance threshold for the polling iteration that is greater than one, and
         upon failure of at least one polling iteration of the plurality of polling iterations,
            wait for a predetermined time interval, and
            subsequent to the predetermined time interval, close the transaction session and facilitate one or more transactions associated with the transaction session based on consumer approval data associated with the transaction session.

2. The apparatus of claim 1, wherein the circuitry is further configured to:
   determine consumer identifying data associated with the consumer device, wherein to determine the consumer identifying data, the circuitry is further configured to:
   transmit the wallet identifying data to a central system; and
   subsequent to transmitting the wallet identifying data to the central system, retrieve, from the central system, the consumer identifying data associated with the wallet identifying data.

3. The apparatus of claim 1, wherein the circuitry is configured to forego initiating the transaction session when the consumer identifying data is retrieved until receiving the request from the consumer device to initiate the transaction session.

4. The apparatus of claim 1, wherein the circuitry is configured to:
   retrieve, second consumer identifying data associated with a second consumer device;
   wirelessly receive a second request from the second consumer device to be added to the transaction session; and
   in response to receiving the second request:
      associate the second consumer device with the transaction session including the merchant device and the consumer device; and
      associate the second consumer identifying data with the transaction session.

5. The apparatus of claim 1, wherein the apparatus determines a merchant proximity score based on the circuitry being configured to determine whether the consumer device is within a communicable range of a direct wireless connection with the merchant device.

6. The apparatus of claim 1, wherein the consumer-present response for each polling iteration of the plurality of polling iterations identifies a first consumer device location for the consumer device that is within a merchant proximity range.

7. The apparatus of claim 1, wherein the circuitry is further configured to, subsequent to initiating the transaction session and prior to closing the transaction session:
   associate one or more items with the transaction session; and
   wirelessly provide an indication of the one or more items to the consumer device.

8. The apparatus of claim 1, wherein the circuitry is further configured to associate the transaction session with a unit of location based on the consumer device being within a communicable range of a PAN comprising a direct wireless connection with at least one of the merchant device and a communication beacon.

9. A machine-implemented method, comprising:
   generating wallet identifying data that is configured to secure data transfers between a consumer device and an apparatus, wherein the wallet identifying data is generated based on one of a random code, a random token, or a random key;
   associating the wallet identifying data with consumer identifying data;
   storing the wallet identifying data to memory associated with the apparatus;
   wirelessly, by the circuitry, receiving a validation request comprising an indication of the wallet identifying data from the consumer device;
   validating an identity of consumer device user profile associated with the consumer device by comparing the indication of wallet identifying data received from the consumer device as part of the validation request to the wallet identifying data stored to the memory associated with the apparatus;

in a circumstance where the identity of the consumer device user profile is validated:

retrieving, by the circuitry, the consumer identifying data based on the wallet identifying data and associate the consumer identifying data with the consumer device;

wirelessly receiving, by the circuitry, a request from the consumer device to initiate a transaction session between a merchant device associated with a merchant and the consumer device;

in response to receiving the request:

establishing, by the circuitry, the transaction session between the merchant device and the consumer device;

associating, by the circuitry, the consumer identifying data with the tab session; and subsequent to initiating the transaction session, and by the circuitry:

at each polling iterations of a plurality of polling iterations, wirelessly polling the consumer device by transmitting one or more polling requests associated with the polling iteration to the consumer device using one or more communication beacons installed within a merchant location associated with the merchant device to trigger a consumer-present response from the consumer device for the polling iteration, wherein wirelessly polling the consumer device during a polling iteration of the plurality of polling iterations comprises determining that the polling iteration has failed in response to determining that the consumer-present response for the polling iteration has not been received by the apparatus after transmitting a defined number of polling requests associated with the polling iteration, and wherein the defined number of polling requests fora polling iteration of the plurality of polling iterations is determined based on a non-response tolerance threshold for the polling iteration that is greater than one, and upon failure of at least one polling iteration of the plurality of polling iterations, waiting for a predetermined time interval, and subsequent to the predetermined time interval, closing the transaction session and facilitate one or more transactions associated with the transaction session based on consumer approval data associated with the transaction session.

10. The method of claim 9 further comprising, by the circuitry:

determining consumer identifying data associated with the consumer device, wherein determining the consumer identifying data comprises the steps of:

transmitting the wallet identifying data to a central system; and retrieving, from the central system, the consumer identifying data associated with the wallet identifying data.

11. The method of claim 9 further comprising forego initiating, by the circuitry, the transaction session when the consumer identifying data is retrieved until receiving the request from the consumer device to initiate the transaction session.

12. The method of claim 9 further comprising, by the circuitry:

retrieving second consumer identifying data associated with a second consumer device;

wirelessly receiving a second request from the second consumer device to be added to the transaction session; and in response to receiving the second request:

associating the second consumer device with the transaction session including the merchant device and the consumer device; and associating the second consumer identifying data with the transaction session.

13. The method of claim 9, further comprising, by the circuitry: determining a merchant proximity score that is determined based on determining whether the consumer device is within a communicable range of a direct wireless connection with the merchant device.

14. The method of claim 9, wherein each consumer-present response for a polling iteration of the plurality of polling iterations identifies a first consumer device location for the consumer device that is within a merchant proximity range.

15. The method of claim 9 further comprising, by the circuitry and subsequent to initiating the transaction session and prior to closing the transaction session:

associating one or more items with the transaction session; and wirelessly providing an indication of the one or more items to the consumer device.

16. The method of claim 9 further including wirelessly receiving the request from the consumer device to initiate the transaction session when the consumer device is within is within a communicable range of a direct wireless connection with the merchant device.

\* \* \* \* \*

UNITED STATES PATENT AND TRADEMARK OFFICE
CERTIFICATE OF CORRECTION

PATENT NO. : 11,037,129 B1
APPLICATION NO. : 14/311098
DATED : June 15, 2021
INVENTOR(S) : Chen et al.

Page 1 of 1

It is certified that error appears in the above-identified patent and that said Letters Patent is hereby corrected as shown below:

In the Claims

<u>Column 35,</u>
Line 39, "requests fora" should read --requests for a--.

Signed and Sealed this
Sixth Day of September, 2022

Katherine Kelly Vidal
*Director of the United States Patent and Trademark Office*